(12) United States Patent
Iwamasa et al.

(10) Patent No.: US 11,726,441 B2
(45) Date of Patent: Aug. 15, 2023

(54) INFORMATION PROCESSING APPARATUS, INFORMATION PROCESSING METHOD, INFORMATION PROCESSING SYSTEM, AND NON-TRANSITORY COMPUTER READABLE MEDIUM

(71) Applicant: KABUSHIKI KAISHA TOSHIBA, Tokyo (JP)

(72) Inventors: Mikito Iwamasa, Shinagawa Tokyo (JP); Koji Fujiwara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/470,544

(22) Filed: Sep. 9, 2021

(65) Prior Publication Data

US 2022/0299958 A1 Sep. 22, 2022

(30) Foreign Application Priority Data

Mar. 17, 2021 (JP) ................. 2021-044069

(51) Int. Cl.
*G05B 19/042* (2006.01)
(52) U.S. Cl.
CPC .... *G05B 19/042* (2013.01); *G05B 2219/2614* (2013.01)
(58) Field of Classification Search
CPC ........ G05B 19/042; G05B 2219/2614
See application file for complete search history.

(56) References Cited

U.S. PATENT DOCUMENTS

| | | | |
|---|---|---|---|
| 2006/0229739 A1 | 10/2006 | Morikawa | |
| 2012/0210158 A1 | 8/2012 | Akiyama et al. | |
| 2016/0036764 A1* | 2/2016 | Dong | H04L 45/22 370/254 |
| 2016/0350364 A1 | 12/2016 | Anicic et al. | |
| 2018/0195749 A1* | 7/2018 | Sinha | G05B 19/042 |
| 2020/0208866 A1* | 7/2020 | Hediger | G05B 15/02 |
| 2021/0088993 A1* | 3/2021 | Stewart | G05B 19/042 |

FOREIGN PATENT DOCUMENTS

| | | |
|---|---|---|
| JP | 2000-259722 A | 9/2000 |
| JP | 2002-373017 A | 12/2002 |
| WO | WO 2016/098805 A1 | 6/2016 |
| WO | WO 2020/103443 A1 | 5/2020 |

* cited by examiner

*Primary Examiner* — Michael W Choi
(74) *Attorney, Agent, or Firm* — Finnegan, Henderson, Farabow, Garrett & Dunner, LLP

(57) ABSTRACT

According to one embodiment, an information processing apparatus includes: processing circuitry configured to select, for a first element of a plurality of elements in first information including the elements and including a first relationship between the elements, relationship setting information being information for setting a second relationship between the first element and at least one second element of the elements; set the second relationship between the first element and the at least one second element, based on the relationship setting information; and determine attribute information on the first element, based on the second relationship and the first information.

21 Claims, 33 Drawing Sheets

```
abstract sig TheEntity {} //room, floor
abstract sig HVAC {} sig AHU extends HVAC {feeds: VAV} sig VAV { points: sensor} sig Floor extends TheEntity {haspart: Room} sig Room extends TheEntity{points: sensor} sig sensor extends TheEntity{ observes: PhyicalBody}

/* device model aka LoP */
abstract sig deviceModel{
    isAssocTo: lone TheEntity abstract sig ThePoint {
    hasDeviceModel: lone deviceModel,
    hasTag: set Tag
} abstract sig PhyicalBody{}
sig temperature extends PhyicalBody{}
sig humidity extends PhyicalBody{}
```

FIG. 5

```
abstract sig Tag {
    partOf:  deviceModel
} sig tagTemp extends Tag{relates: lone PhyicalBody}
sig tagSensor extends Tag{}
sig roomRef extends Tag{isLocated:lone Room }
sig ahuRef extends Tag{controledBy:lone AHU}
```

FIG. 6

```
//RELATIONSHIP BETWEEN "Tag" AND "DeviceModel"
fact LoPsjrk {
    all n:rmTempSensorCtrAhu | one q1:tagTemp|
        q1.partOf=n
    all n:rmTempSensorCtrAhu | one q2:tagSensor|
        q2.partOf=n
    all n:rmTempSensorCtrAhu | one q2:roomRef|
        q2.partOf=n
    all n:rmTempSensorCtrAhu | one q2:ahuRef|
        q2.partOf=n
} fact tempTag{
    all t:tagTemp,d:deviceModel,s:sensor,p:temperature|
        t.partOf=d and d.isAssocTo=s and s.observes=p implies t.relates=p
    all t:roomRef,d:deviceModel,s:sensor,r:Room|
        t.partOf=d and d.isAssocTo=s and r.points=s implies t.isLocated=r
    all t:ahuRef,d:deviceModel,s:sensor,a:AHU,v:VAV|
        t.partOf=d and d.isAssocTo=s and a.feeds=v and v.points=s implies t.controledBy=a
} fact everyTagPartOfdeviceModel{
    all n:Tag | one q:deviceModel | q in n.partOf
}
```

FIG. 7

```
fact allRmHasSensor{
    all r:Room| one s:sensor | r.points = s
}
```

FIG. 8

```
/* instance */
one sig FL1 extends Floor(){}
one sig RM101 extends Room(){}
one sig tmpsensor101 extends sensor(){
    observes=temperature
}
one sig rmTempSensorCtrAhu extends deviceModel(){
    isAssocTo= sensor
}
one sig fl101 extends ThePoint(){
    hasTag= tagTemp + tagSensor + roomRef+ahuRef
}
```

FIG. 9

| SUBJECT | | RELATIONSHIP | TARGET | |
|---|---|---|---|---|
| INSTANCE NAME | CLASS | RELATIONSHIP | INSTANCE NAME | CLASS |
| fl101$0 | ThePoint | hasTag | ahuRef$0 | Tag |
| fl101$0 | ThePoint | hasTag | roomRef$0 | Tag |
| fl101$0 | ThePoint | hasTag | tagSensor$0 | Tag |
| fl101$0 | ThePoint | hasTag | tagTemp$0 | Tag |
| ahuRef$0 | Tag | controlledBy | AHU$0 | AHU |
| ahuRef$0 | Tag | partOf | mTempSensorCtrAhu$0 | deviceModel |
| roomRef$0 | Tag | partOf | mTempSensorCtrAhu$0 | deviceModel |
| tagSensor$0 | Tag | partOf | mTempSensorCtrAhu$0 | deviceModel |
| tagTemp$0 | Tag | partOf | mTempSensorCtrAhu$0 | deviceModel |
| AHU$0 | AHU | feeds | VAV$0 | VAV |
| VAV$0 | VAV | points | tempsensor101$0 | sensor |
| tempsensor101$0 | sensor | observes | temperature$0 | temperature |
| FL$0 | Floor | hasPart | RM101$0 | Room |
| RM101$0 | Room | points | tempsensor101$0 | sensor |
| mTempSensorCtrAhu | deviceModel | isAssocTo | tempsensor101$0 | sensor |
| tagTemp$0 | Tag | relates | tempsensor101$0 | sensor |

FIG. 11

```
//assert
assert everyTagRelatedToPoint{
    all n:Tag | one p:ThePoint | n in p.hasTag
}
```

FIG. 12

| SUBJECT | | RELATIONSHIP | TARGET | |
|---|---|---|---|---|
| INSTANCE NAME | CLASS | RELATIONSHIP | INSTANCE NAME | CLASS |
| fl101$1 | ThePoint | hasTag | roomRef$0 | Tag |
| fl101$1 | ThePoint | hasTag | tagSensor$0 | Tag |
| fl101$1 | ThePoint | hasTag | tagTe$0mp$0 | Tag |
| ahuRef$0 | Tag | controlledBy | AHU$0 | AHU |
| ahuRef$0 | Tag | partOf | mTempSensorCtrAhu$0 | deviceModel |
| roomRef$0 | Tag | partOf | mTempSensorCtrAhu$0 | deviceModel |
| tagSensor$0 | Tag | partOf | mTempSensorCtrAhu$0 | deviceModel |
| tagTemp$0 | Tag | partOf | mTempSensorCtrAhu$0 | deviceModel |
| AHU$0 | AHU | feeds | VAV$0 | VAV |
| VAV$0 | VAV | points | tempsensor101$0 | sensor |
| tempsensor101$0 | sensor | observes | temperature$0 | temperature |
| FL1$0 | Floor | hasPart | RM101$1 | Room |
| RM101$1 | Room | points | tempsensor101$0 | sensor |
| mTempSensorCtrAhu$0 | deviceModel | isAssocTo | tempsensor101$0 | sensor |
| tagTemp$0 | Tag | relates | tempsensor101$0 | sensor |

FIG. 14

| SUBJECT | | RELATIONSHIP | TARGET | |
|---|---|---|---|---|
| INSTANCE NAME | CLASS | RELATIONSHIP | INSTANCE NAME | CLASS |
| fl101$1 | ThePoint | hasTag | ahuRef$0 | Tag |

FIG. 16

| SENSOR VARIABLE (CONTACT POINT) | DEVICE TYPE | CONTROL TARGET | LOCATION | OBSERVATION TARGET | OBSERVATION VALUE |
|---|---|---|---|---|---|
| FI101 | tmpsensor101$0 (TEMPERATURE SENSOR) | AHU$0 | RM101$0 | temperatu re$0 (TEMPERATURE) | 147 |
| ... | ... | ... | ... | ... | ... |
| ... | ... | ... | ... | ... | ... |

FIG. 17

```
abstract sig deviceModel {
    isAssocTo: lone TheEntity}
abstract sig ThePoint {
//  hasDeviceModel: lone deviceModel
    hasLoP: set LoP}
abstract sig TheEntity {} sig control extends TheEntity{}
sig actuator extends TheEntity{}
sig sensor extends TheEntity{} sig MAIN STEAM FLOWMETER extends sensor {ctr_input: set control}{
    ctr_input =FURNACE PRESSURE CONTROL+DRUM LEVEL CONTROL}
sig FURNACE PRESSURE CONTROL extends control{ctr_cascade: set control}{
    ctr_cascade=AIR FLOW RATE CONTROL+FUEL FLOW RATE CONTROL}
sig DRUM LEVEL CONTROL extends control{ctr_output:actuator }{
    ctr_output = DRUM LEVEL CONTROL DEVICE}
sig FUEL FLOW RATE CONTROL extends control{ctr_output:actuator}
    ctr_output=FUEL FLOW RATE ADJUSTMENT VALVE}
sig AIR FLOW RATE CONTROLNTROL extends control{ctr_output:actuator  }{
    ctr_output= AIR FLOW RATE ADJUSTMENT VALVE} sig DRUM LEVEL CONTROL DEVICE extends actuator{}
sig FUEL FLOW RATE ADJUSTMENT VALVE extends actuator{}
sig AIR FLOW RATE ADJUSTMENT VALVE extends actuator{}

//boiler CONTROL-SPECIFIC RESTRICTION
fact boilerConstraints{
    all n:MAIN STEAM FLOWMETER|#(n.ctr_input)=2
    all n:FURNACE PRESSURE CONTROL|#(n.ctr_cascade)=2}
```

FIG. 22

```
abstract sig LoP{
    partOf:  deviceModel
}
//DEFINITION OF LoPMin
one sig LoP STEAM extends LoP{}{
    partOf=DM MAIN STEAM FLOWMETER
}
one sig LoP FLOW RATE extends LoP{}{
    partOf=DM MAIN STEAM FLOWMETER
}
one sig LoP SENSOR extends LoP{}{
    partOf=DM MAIN STEAM FLOWMETER
}
```

FIG. 23A

```
fact everyLoPAsscToTheEntity{
    all n:deviceModel | one q:TheEntity | q in n.isAssocTo
}
```

FIG. 23B

```
fact LoPsjrk {
    all n:DM MAIN STEAM FLOWMETER | one q1:LoP STEAM |
        q1.partOf=n
    all n:DM MAIN STEAM FLOWMETER | one q2:LoP FLOW RATE |
        q2.partOf=n
    all n:DM MAIN STEAM FLOWMETER | one q2:LoP SENSOR |
        q2.partOf=n
} fact everyLoPAsscToTheEntity{
    all n:LoP | one q:deviceModel | q in n.partOf
}
//assert
fact everyLoPrelatedToPoint{
    all n:LoP | one p:ThePoint | n in p.hasLoP
}
```

FIG. 24

```
one sig fi101 extends ThePoint(){
    hasLoP = LoP STEAM + LoP FLOW RATE + LoP SENSOR
    // hasLoPMin = LoPMin STEAM
}
one sig pic102 extends ThePoint(){
    hasLoP = LoP FURNACE PRESSURE CONTROL
}
one sig fic101s extends ThePoint(){
    hasLoP = LoP FUEL FLOW RATE ADJUSTMENT VALVE
}
one sig fic103 extends ThePoint(){
    hasLoP = LoP AIR FLOW RATE ADJUSTMENT VALVE
}
```

FIG. 25

```
//assert
assert everyLoPrelatedToPoint{
    all n:LoP | one p:ThePoint | n in p.hasLoP
}
```

FIG. 27

SOURCE DATA STRUCTURE

```
<opc-ua>
<Variables>
<Variable name="fl101">
<LoPs lop=["LoP STEAM", "LoP FLOW RATE", ...] />
<value>133</value>
</Variable>
..
```

| SENSOR VARIABLE (CONTACT POINT) | ITEM1 | ITEM2 | ITEM3 | ITEM4 | ITEM5 |
|---|---|---|---|---|---|
| FI101 | BoilerSystem | Drum101 | Pipe_Steam | MAIN STEAM FLOW RATE | 133 |
| ... | ... | ... | ... | ... | ... |

FIG. 32B

| SENSOR VARIABLE (CONTACT POINT) | Boiler System | Pipe_Oil | Pipe_Air | Drum 101 | Pipe_Steam | ... | FUEL FLOW RATE ADJUSTMENT VALVE | AIR FLOW RATE ADJUSTMENT VALVE | MAIN STEAM FLOW RATE | ... |
|---|---|---|---|---|---|---|---|---|---|---|
| FI101 | T | F | F | T | T | ... | F | F | T | ... |
| ... | ... | ... | ... | ... | ... | ... | ... | ... | ... | ... |

INFORMATION PROCESSING APPARATUS, INFORMATION PROCESSING METHOD, INFORMATION PROCESSING SYSTEM, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-044069, filed on Mar. 17, 2021, the entire contents of which are incorporated herein by reference.

FIELD

The embodiments described herein relate to an information processing apparatus, an information processing method, an information processing system, and a non-transitory computer readable medium.

BACKGROUND

In IoT (Internet of Things) systems, there is a method of collecting data obtained by sensors located in facilities according to the configurations of the facilities and a scheme of controlling the facilities, on the basis of calculation using the collected data, and of controlling the facilities through control devices (actuators). This method requires verification of attribute information on the sensors having collected the data, in order to use the collected data. For example, the attribute information may be information, such as on the types of sensors, the locations of sensors, and targets that the sensors are to measure. There is a method of allowing a person to set attribute information for sensors, and obtaining attribute information together with sensor data, in order to obtain the attribute information on the sensors. However, there is sometimes a lack of setting.

Accordingly, there is a scheme that generates information model representing a scheme of controlling the configurations of facilities and a method of controlling the facilities, and creates a relationship table between the information model and the sensors. However, association between the information model and the sensors is required to be made again every time a new facility is installed or the facilities are changed. Accordingly, the efficiency is low.

BRIEF DESCRIPTION OF THE DRAWINGS

FIG. 5 shows an example of describing the information model in FIG. 4 in an Alloy form;

FIG. 6 shows an example of describing tag definition information in the Alloy form;

FIG. 7 shows an example of defining a restriction of tag information in the Alloy form;

FIG. 8 shows an example of defining a restriction of the information model with Alloy;

FIG. 9 shows an example where a user inputs a definition of an instance;

FIG. 11 shows an example of an instance table that includes the same content as in FIG. 10;

FIG. 12 shows an example of an "assert" definition;

FIG. 14 shows the counterexample in a table format;

FIG. 16 shows information about a lacking "ahuRef" tag in a single row;

FIG. 17 shows an example of a sensor database;

FIG. 22 shows an example of describing the information model in FIG. 21 in the Alloy form;

FIGS. 23A and 23B show an example of a definition of and a restriction of tag information;

FIG. 24 shows an example of a restriction of tag information;

FIG. 25 shows a situation of setting the tag information;

FIG. 27 shows an example of an "assert" definition;

FIG. 30 shows an example of a data structure (source data structure) of a sensor;

FIGS. 32A and 32B show an example of a sensor database; and

DETAILED DESCRIPTION

Figure 1:
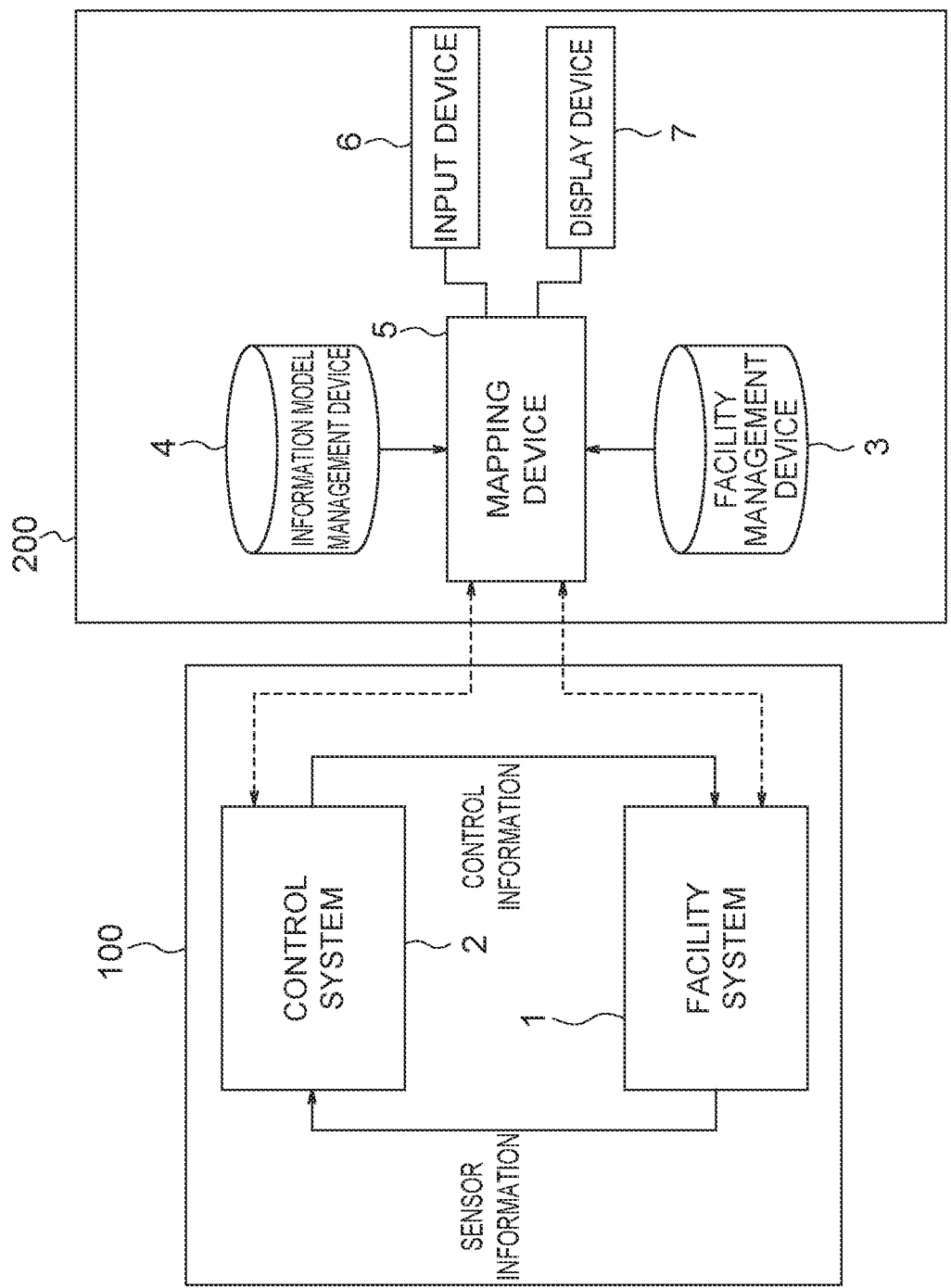
FIG. 1 shows an information processing system according to a first embodiment.

According to one embodiment, an information processing apparatus, includes: a selector configured to select, for a first element of a plurality of elements in first information including the elements and including a first relationship between the elements, relationship setting information being information for setting a second relationship between the first element and at least one second element of the elements; a setter configured to set the second relationship between the first element and the at least one second element, based on the relationship setting information; and a determiner configured to determine attribute information on the first element, based on the second relationship and the first information.

Embodiments of the present invention collect data from one or more sensors and the like located in physical facilities, and operate one or more actuators (operation devices) for the physical facilities on the basis of the collected data, thereby allowing the embodiments to be used for a system that controls a controlled target. The controlled target is a temperature in a space where the facility is located, for example. The system (target system) serving as a target in the embodiments is configured as an IoT (Internet of Things) system, for example.

Hereinafter, referring to the drawings, the embodiments are described.

First Embodiment

FIG. 1 shows the configuration of an information processing system according to a first embodiment. The information processing system in FIG. 1 includes a target system 100, and an information processing apparatus 200. The target system 100 includes a facility system 1, and a control system 2. The information processing apparatus 200 includes a facility management device 3, an information model management device 4, a mapping device 5, an input device 6, and a display device 7. This embodiment shows an example in a case where the target system 100 is an air conditioning system.

The facility system 1 includes physical facilities, and sensors and actuators (operation devices) located in the facilities. The physical facilities variously include devices, buildings, floors, rooms and ducts.

The control system 2 collects data detected by sensors of the target system 100, performs calculation through a control program or the like on the basis of the collected data, and operates actuators (operation devices) using control information obtained on the basis of a calculation result, thereby allowing the facility system 1 to be controlled. For example, the control system 2 includes an AHU (Air Handling Unit) as a control device. The actuator is, for example, a variable air volume system (VAV).

The facility management device 3 stores information about the facilities, the sensors and the actuators, which are included in the facility system 1. For example, the facility management device 3 stores identifiers (e.g., serial numbers, names or the like) of the facilities, the sensors, and actuators. The facility management device 3 may further include information about the control device or a control system included in the control system 2.

The information model management device 4 manages information that defines the relationships between the facilities, the sensors, the actuators, and the control program. For example, this device stores information that defines which facility provided with a sensor having data assigned to a certain variable of the control program, and which actuator the control information is generated through calculation of the control program (the variable for operating a certain actuator) and the like. To obtain information defining such relationships, this embodiment allows attribute information on a sensor to be easily determined from data received from the sensor, for example. The attribute information includes, for example, information on the types of sensors, physical quantities that the sensors are measuring, floors and rooms provided with the sensors, and actuators to be operated on the basis of data on the sensors. Determination of the attribute information on the sensors can specifically identify the sensors, and also specifically identify which actuators related to the sensors are. Accordingly, it can be easily determined which variable of the control program is assigned data on the sensor, and which actuator is to be controlled on the basis of the calculation result based on the control program (which variable for operating the actuator is to be calculated). The control program where the sensors and the actuators are mapped is transmitted to the control system 2, and can be executed by the control system 2.

The input device 6 is an interface through which a user as an operator inputs data or an instruction. The input device 6 is, for example, a keyboard, a mouse, a touch panel, an audio input device, a gesture input device and the like.

The display device 7 is a display that displays data or information on a screen. The display device 7 is, for example, a liquid display panel, an organic EL display panel or the like. The input device 6 and the display device 7 are connected to the mapping device 5 wiredly or wirelessly.

Figure 2:
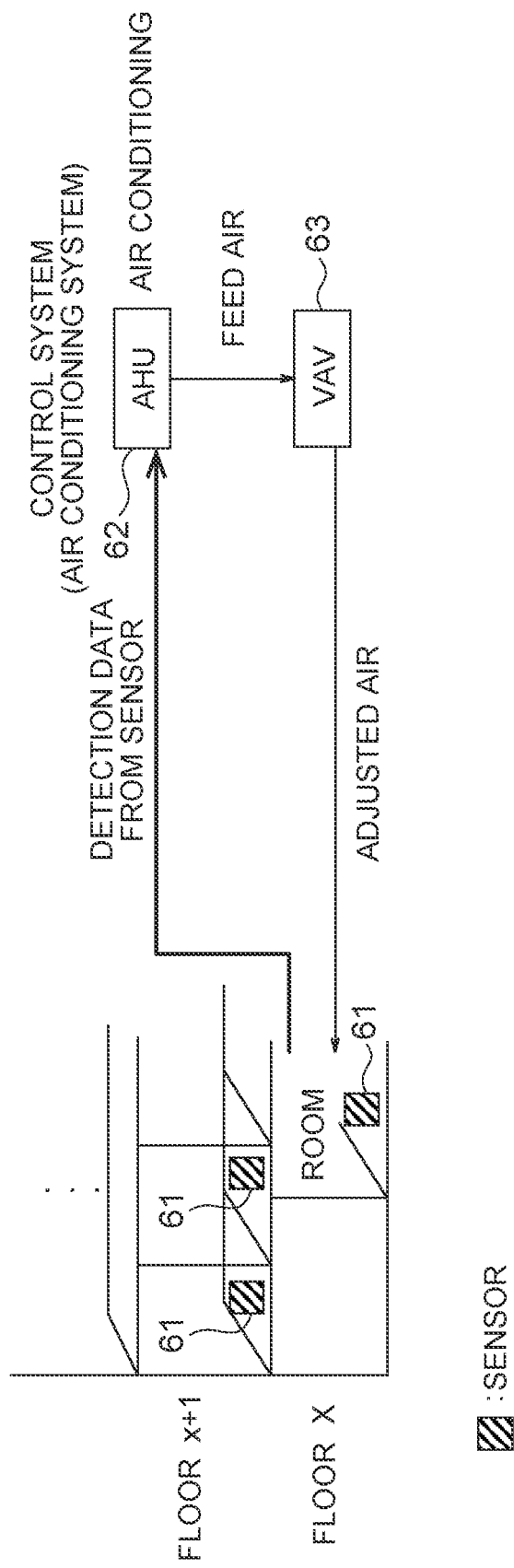
FIG. 2 schematically shows a specific example of a building air conditioning system as a target system in this embodiment.

FIG. 2 schematically shows a specific example of a building air conditioning system as the target system 100 in this embodiment. The building in the target system 100 includes multiple floors. The floor includes multiple rooms. A temperature sensor 61 is located in each room. In the diagram, the temperature sensor 61 is located in only one room. However, temperature sensors or other types of sensors may be located in other rooms. The control system 2 that controls air conditioning is provided with an air handling unit (AHU) 62. Detection data by the temperature sensor 61 located in the room is transmitted to the AHU 62. To adjust the temperature of air to be supplied, in conformity with the temperature in the room, the AHU 62 performs air conditioning, such as air heating, cooling and mixing with external air. The AHU 62 supplies the room with conditioned air using a variable air volume system (VAV) 63. Hereinafter, description is made based on a specific example in FIG. 2.

Figure 3:
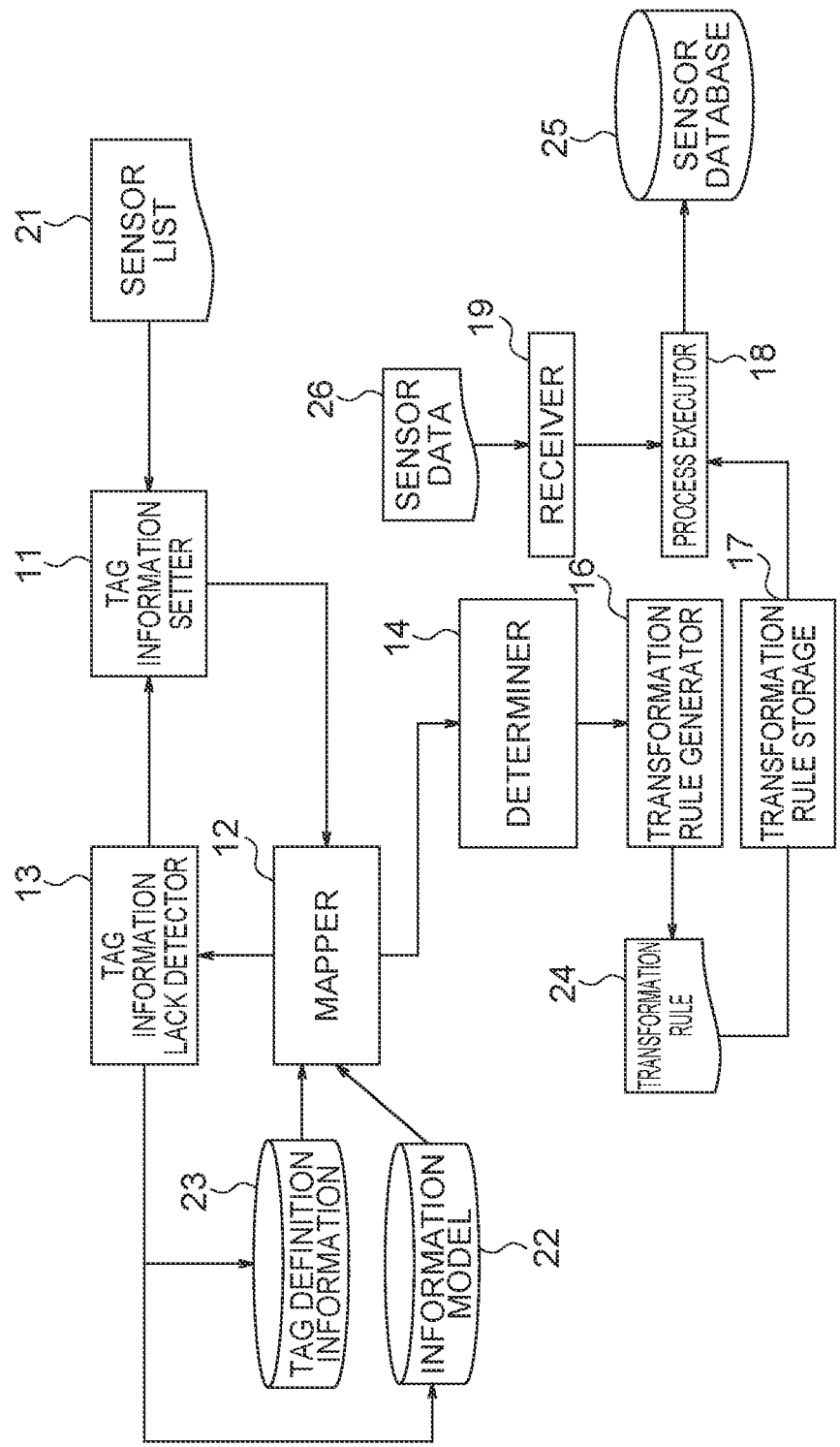
FIG. 3 is a block diagram of a mapping device.

FIG. 3 is a block diagram of the mapping device 5. The mapping device 5 includes a tag information setter 11 (selector), a mapper 12 (setter), a restriction infringement detector 13 (detector), a determiner 14, a process executor 18, a receiver 19, a sensor list 21, an information model 22 (first information), tag definition information 23, and a sensor database 25. The information model 22 and the tag definition information 23 may be stored in the information model management device 4 in FIG. 1. The elements 11, 12, 13, 14, 18, 19 can be configured by circuitry. For example, the elements 11, 12, 13, 14 can be configured by processing circuitry, the element 19 can be configured by receiving circuitry, and the element 18 can be configured by process executing circuitry. Part or all of the processing circuitry, and the receiving circuitry and the process executing circuitry may be physically the same circuitry or different circuitry. The elements 21, 22, 23, 25 can be stored in a hardware storage such as a memory device, a hard disk drive or an optically readable device.

Figure 4:
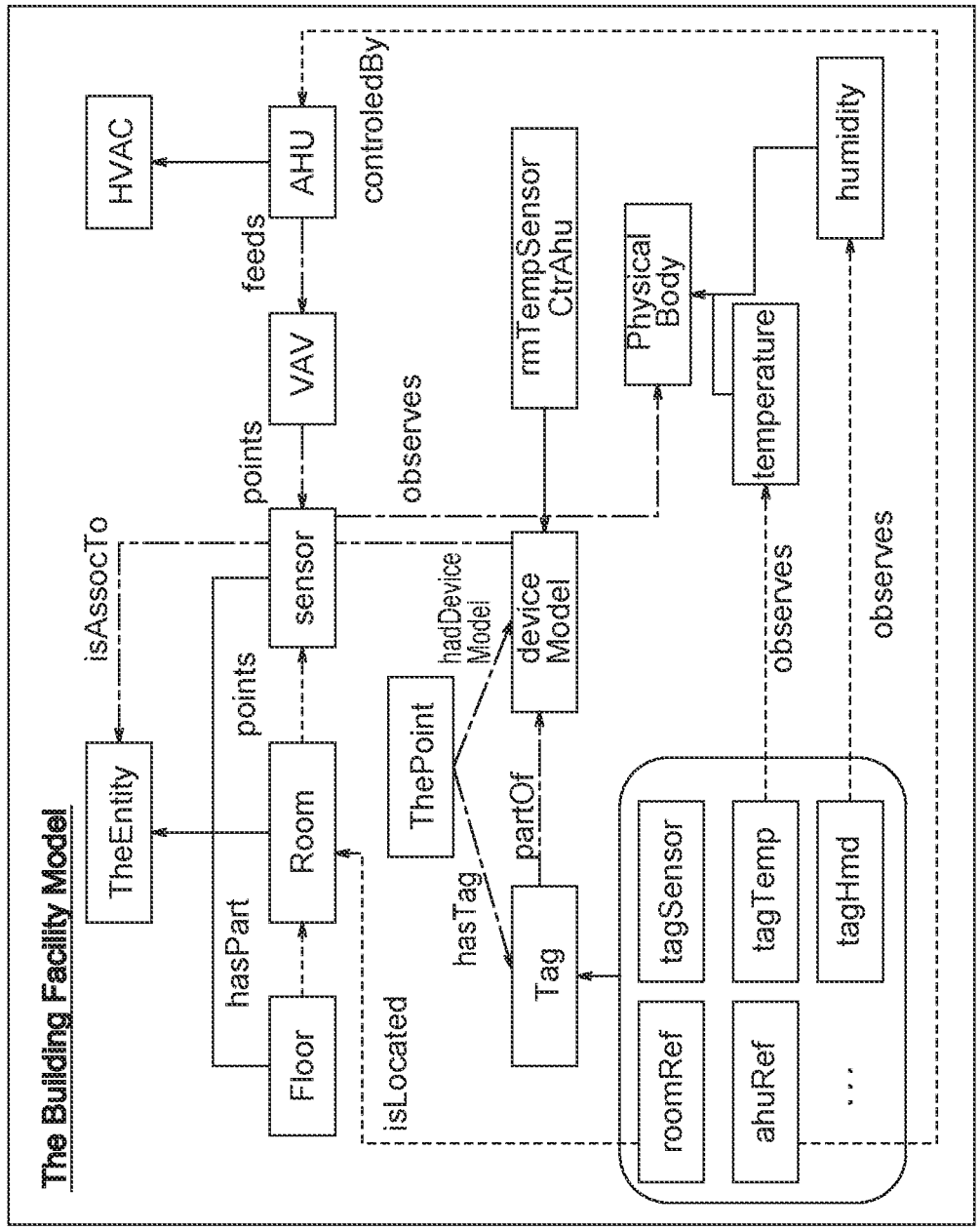
FIG. 4 schematically shows an information model according to a class diagram of software engineering.

FIG. 4 schematically shows the information model 22 corresponding to the building air conditioning system in this embodiment according to a class diagram of the software engineering. The information model 22 can be described by, for example, a language or software called Alloy, as described later. Alloy can define a restriction between classes (elements) using a logical expression, in addition to class definition in an object-oriented system, and is suitable to describe an information model. Small rectangles in FIG. 4 correspond to classes (elements of an information model, or elements of the target system 100). In FIG. 4, "Tag", and "roomRef", "ahuRef", "tagSensor", "tagTemp" and "tagHmd" in a corner-rounded rectangle at the lower left represent classes of tag information (labels) corresponding to relationship setting information according to this embodiment. The tag information is defined by the tag definition information 23. Black solid lines represent inheritances of classes. Broken lines represent relationships between classes. The broken-line relationships from tag information ("observes", "controledBy", etc.) correspond to a second relationship defined (added) by the tag information. Other broken-line relationships ("feeds", "points", "points", "hasPart", etc.) basically correspond to first relationships between elements in the target systems (the facility system and the control system). Broken-line relationships ("hasTag", "had DeviceModel", "isAssocTo") coupled to classes ("ThePoint", "deviceModel") defined to add (set) the second relationship by the tag information also correspond to the first relationship. In the following description of the class diagram, each element is sometimes referred to without assigning "class" to the name of the corresponding element. For example, "AHU" class is sometimes simply called "AHU".

"AHU" is a subclass of an air conditioning ("HVAC": Heating Ventilation and Air Conditioning) class. "AHU" feeds air to "VAV". "VAV" uses "sensor" as observation points ("points").

A building facility ("TheEntity") includes "Floor", "Room", and "sensor". "Floor" has "Room" as a part thereof ("hasPart"). In "Room", "sensor" is located as observation points ("points").

A device model ("deviceModel") is a class representing a device to which a label called tag information is set. The tag information corresponds to an example of the relationship setting information that includes a condition that the second relationship is set for the device. An example of the device model is a temperature sensor ("rmTempSensorCtrAhu") under control by "AHU". "rmTempSensorCtrAhu" is a subclass of the device model. The device model is associated to ("isAssocTo") the facility ("TheEntity"). Physical bodies ("PhysicalBody") include the temperature ("Temperature") and humidity ("Humidity"). The temperature and the humidity are subclasses of a physical object class (or physical quantity class) ("PhysicalBody").

A contact point ("ThePoint") is associated to ("hasDeviceModel") the device model ("deviceModel"), and can have ("hasTag") a plurality of "Tag". The contact point ("ThePoint") means a contact point with a device (the temperature sensor in the example in the diagram) represented by the device model, and can be also called a class that alternatively indicates the device. The device model may represent not only the sensor but also another device, such as an actuator. That is, the class of the actuator may be defined by inheriting the device model. In this embodiment, the sensor corresponds to first elements with which the second relationship is set. The elements other than the first elements correspond to second elements. The information model according to this embodiment corresponds to first information that includes a plurality of first elements and the relationships between the first elements.

As shown at the lower left of the diagram, "Tag" class includes "roomRef", "tagSensor", "ahuRef", "tagTemp" and "tagHmd". "Tag" class is inherited to generate tag information on "roomRef", "tagSensor", "ahuRef", "tagTemp" and "tagHmd" subclasses.

"tagTemp" corresponds to tag information representing "observe" "temperature". "tagHmd" corresponds to tag information representing "observe" "humidity". "roomRef" corresponds to tag information representing that the contact point is located "isLocated" in "Room". "ahuRef" represents that the contact point (i.e., the temperature sensor) is controlled by "controlledBy" "AHU". "tagSensor" represents that the contact point regards the temperature sensor (first element) as a specific device, serving as a target.

As described later, the tag information is defined by the tag definition information 23 in a predetermined language. This embodiment assumes a case of using the language or software called Alloy. The tag definition information 23 defines not only the tag information itself, but also a restriction between the elements in the information model and the tag information. The information model defines not only the information model itself, but also a restriction in the information model. Hereinafter, examples of restrictions about the tag information or the information model (restrictions 1 to 4) are shown. The restriction 2 is a restriction about the information model. The restrictions 1, 3 and 4 are restrictions about the tag information.

<Restriction 1> If the device model including "tagTemp" relates to "sensor" and the sensor "observe(s)" "temperature", "tagTemp" "relate(s)" to the temperature.
<Restriction 2> "sensor" is in every "Room".
<Restriction 3> Every "Tag" should be "part of" any device model.
<Restriction 4> Every "Tag" belongs to any contact point ("hasTag").

The restriction 1 includes a condition that the second relationship is set in the information model. That is, the tag information having the restriction 1 is an example of relationship setting information that includes a condition that a second relationship is set for the first element of the information model (e.g., the temperature sensor) with respect to the second element (e.g., the temperature). For example, "tagTemp" is relationship setting information that includes a condition that the temperature and the second relationship ("relate") are set for "sensor" (provided that the device model including "tagTemp" relates to "sensor", and the sensor "observe(s)" the "temperature").

The restrictions 1 to 4 described above are only examples. Other various restrictions are allowed.

FIG. 5 shows an example of description of the information model in FIG. 4 in an Alloy form. "abstract sig" represents a definition of an abstract class. "sig" is a definition of a class, and "extends" represents inheritance of a class. Names ("feeds", "points", etc.) at the left of ":" represent relationships with classes at the right of ":". "lone" indicates one at most, and "set" means that a plurality is allowed. For example, "ThePoint" may have a plurality of "Tag" ("hasTag: set Tag"). Note that in FIG. 5, definition of "rmTempSensorCtrAhu" class in FIG. 4 is omitted.

FIG. 6 shows an example of describing tag definition information in the Alloy form. "Tag" is defined as an abstract class. "Tag" is part of ("partOf") "deviceModel". "Tag" is inherited, and four tags ("tagTemp", "tagSensor", "roomRef" and "ahuRef") are defined. For example, "tagTemp" represents that "deviceModel" to which "tagTemp" belongs relates only to one "PhysicalBody" at most. "roomRef" represents that this "deviceModel" is located only in one "Room" at most. "ahuRef" represents that this "deviceModel" is controlled only by one "AHU" at most.

FIG. 7 shows an example of defining a restriction of tag information in the Alloy form. The restriction is also included in the tag definition information 23. "fact" means a restriction. Note that "LoP" immediately after "fact" is an abbreviation of "List of Property".

The restriction on the upper side of FIG. 7 is a restriction that the temperature sensor represented by the device model under control of AHU ("rmTempSensorCtrAhu") includes four tags ("tagTemp", "tagSensor", "roomRef" and "ahuRef") as components. Note that ":" is E that defines a variable, in a definition of a restriction. A symbol (e.g., "n") on the left side of ":" represents "n" that is an element included in a tag or class on the right side. By describing a restriction expression about "n", the restriction of the tag or class to which "n" belongs is represented. For example, "n:

rmTempSensorCtrAhu" represents a certain element included in a class "rmTempSensorCtrAhu" by "n".

At the middle of FIG. 7, three restrictions are indicated. These three restrictions correspond to addition (setting) of the relationship indicated by the tag information when the condition is satisfied. That is, each restriction is a condition that the corresponding "Tag" ("tagTemp", "romRef" and "ahuRef") sets the second relationships ("relates", "isLocated" and "controledBy") for the first element (e.g., the temperature sensor) in the information model. The details of the three restrictions are as follows.

The first restriction indicates that if "deviceModel" assigned "tagTemp" relates to "sensor" and "sensor" "observes" "temperature", "tagTemp" "relate(s)" to the temperature. Note that in the restriction expression, "tagTemp" is defined by "t". "(I)f 'deviceModel' assigned 'tagTemp' relates to 'sensor' and 'sensor' 'observes' 'temperature'" corresponds to a condition for setting "relate" (second relationship).

The condition for setting the second relationship is based on the first relationship (the same applies to the followings). In this example, the condition is that the first relationship (relationship: "isAssocTo") resides between "sensor" that is the first element and "deviceModel" that is the second element, and the first relationship (observation: "observes") resides between "sensor" that is the first element and the temperature ("temperature") that is the second element. In FIGS. 4 and 5, "isAssocTo" resides between "sensor" and "deviceModel" (via "TheEntity"), and "observes" resides between "sensor" and "temperature" (via "PhysicalBody"). Accordingly, the condition is satisfied. "isAssocTo" and "Observes", which are examples of the first relationships described above, correspond to the types of the first relationships.

The second restriction indicates that if "deviceModel" assigned "roomRef" relates to "sensor", and "room" is ("points") having a sensor ("sensor"), "roomRef" is located ("isLocated") in the room. "(I)f 'deviceModel' assigned 'roomRef' relates to 'sensor', and 'room' is ('points') having a sensor ('sensor')", corresponds the condition for setting "isLocated" (second relationship). It is shown that the condition is satisfied, according to FIGS. 4 and 5.

That is, in this example, the condition is that the first relationship (relationship: "isAssocTo") resides between "sensor" that is the first element and "deviceModel" that is the second element, and the first relationship ("points") resides between "sensor" that is the first element and the room ("room") that is the second element. In FIGS. 4 and 5, "isAssocTo" resides between "sensor" and "deviceModel" (via "TheEntity"), and "points" resides between "sensor" and "room" (via "PhysicalBody"). Accordingly, the condition is satisfied. "isAssocTo" and "points", which are examples of the first relationships described above, correspond to the types of the first relationships.

The third restriction indicates that if "deviceModel" assigned "ahuRef" relates to "sensor", "AHU" supplies air to "VAV", and "VAV" relates to "sensor", "ahuRef" is controlled by ("controledBy") "AHU". "(I)f 'deviceModel' assigned 'ahuRef' relates to 'sensor', 'AHU' supplies air to 'VAV', and 'VAV' relates to 'sensor'" corresponds to the condition for setting "controledBy" (second relationship). It is shown that the condition is satisfied, according to FIGS. 4 and 5.

That is, in this example, the condition is that the first relationship (relationship: "isAssocTo") resides between "sensor" that is the first element and "deviceModel" that is the second element, "feeds" resides between "AHU" that is the second elements and "VAV" that is also the second elements, and the first relationship ("points") resides between "sensor" that is the first element and the "VAV" that is the second element. In FIGS. 4 and 5, "isAssocTo" resides between "sensor" and "deviceModel" (via "TheEntity"), "feeds" resides between "AHU" and "VAV", and "points" resides between "sensor" and "VAV". Accordingly, the condition is satisfied. "isAssocTo", "points" and "feeds", which are examples of the first relationships described above, correspond to the types of the first relationships.

The restriction on the lower side of FIG. 7 indicates that every Tag is part of ("part of") any "deviceModel".

FIG. 8 shows an example of defining a restriction in the information model in Alloy. The restriction in FIG. 8 indicates that "one" "sensor" is in each of "all" "Room(s)".

The information model 22 and the tag definition information 23 have thus been described above.

The sensor list 21 is a list of one or more sensors. For example, the list is of identifiers of (identification information on) the sensors.

The tag information setter 11 assigns one or more pieces of tag information to each sensor included in the sensor list 21. More specifically, as described above, a class (a class called a contact point with the sensor) for setting the relationship (second relationship) for the sensor with respect to another element is defined. Tag information is set for an instance of the contact point class. For example, an identifier of the sensor is used as the name of the instance (the name of the contact point). The name of the contact point may be the defined identifier, only if one-to-one association with the sensor is achieved. The tag information setter 11 generates description of setting the tag information for the contact point as described above, on the basis of an input by the user through the input device 6. This description is made according to a predetermined language (e.g., Alloy described above).

Hereinafter, an example is shown in which four pieces of tag information that are "tagTemp", "tagSensor", "roomRef" and "ahuRef" are set for a contact point ("FI101"). Note that a plurality of contact points may be defined. In this case, tag information (e.g., "tagHmd"), which is not used below, may be set for another contact point.

TABLE 1

| Contact point name | Tag information |
| --- | --- |
| FI101 | [tagTemp, tagSensor, roomRef, ahuRef] |

The tag information setter 11 defines instance generation on the basis of an input by the user. The definition of the tag information for the contact point described above may be performed in a manner of being included in the definition of the instance generation.

FIG. 9 shows an example where a user inputs a definition of an instance. The tag information setter 11 generates a definition of an instance on the basis of an input by the user. Similar to the example described above, at the bottom, a situation is shown where a definition of setting (assigning) four tags that are "tagTemp", "tagSensor", "roomRef" and "ahuRef", for an instance (an instance inheriting "ThePoint" class) of the contact point "FI101" with the sensor. The operation corresponds to the user assigning four pieces of tag information to the sensor corresponding to the contact point "FI101". Note that for example, when the user missed to assign a certain piece of tag information to the contact point "FI101", correction of adding the tag information can be performed on this screen as described later. On this screen, an instance of "FL1" inheriting "Floor" is defined as another instance. An instance of "RM101" inheriting "Room" is defined. An instance of "tmsensor101" inheriting "sensor" is defined. An instance of "rmTempSensorCtrAhu" inheriting "deviceModel" is defined. As described above, an instance of "fl101" inheriting "ThePoint" is defined.

The mapper 12 generates instance information (an instance diagram or an instance table) on the basis of definition information on instance generation generated by the tag information setter 11, the information model 22 and the tag definition information 23. The instance information is generated so as to satisfy the restriction described above (the restriction of the tag information, and the restriction of the information model). The generated instance information corresponds to performance of a process of adding the second relationship defined by the tag information to the information model of the target system.

As described above, the tag information adds the second relationship to the device (the temperature sensor in this example) indicated by "deviceModel" in response to satisfaction of the condition (see "fact temp Tag{ }") shown at the middle of FIG. 7. The second relationship corresponds to the relationship between the temperature sensor and other elements (instances of the target system other than the sensor) having not been defined in the original information model. Such association of the temperature sensor with the other elements (the instances of the target system other than the sensor) in the information model according to the second relationship so as not to infringe the restriction is called mapping. In this example, all the conditions about the three pieces of tag information shown at the middle of FIG. 7 are satisfied. No second relationship is added to tag information about unsatisfied conditions.

The instance generation is performed on the basis of definition information on instance generation, tag definition information (including a restriction of tag information), and the information model (including a restriction of the information model). The instance generation comes down to a restriction satisfaction problem in the software engineering, and can come down to a case of satisfying a limit (=instance) retrieval problem. Mapping can be achieved using software about restriction satisfaction in the software engineering.

In this embodiment, instance generation is performed using Alloy (software) described above. Alloy generates an instance that satisfies the class definition and restriction, using a restriction satisfaction solver. Alloy determines whether a property or a restriction to be verified is satisfied or not using "assert" syntax. If not satisfied, Alloy can produce a counterexample (an example with an unsatisfied property or restriction). An instance is generated on the basis of the definition of instance generation in FIG. 9, an instance in a class related to the generated instance is generated, and the relationship between the instances is grasped, thus generating instance information.

Figure 10:
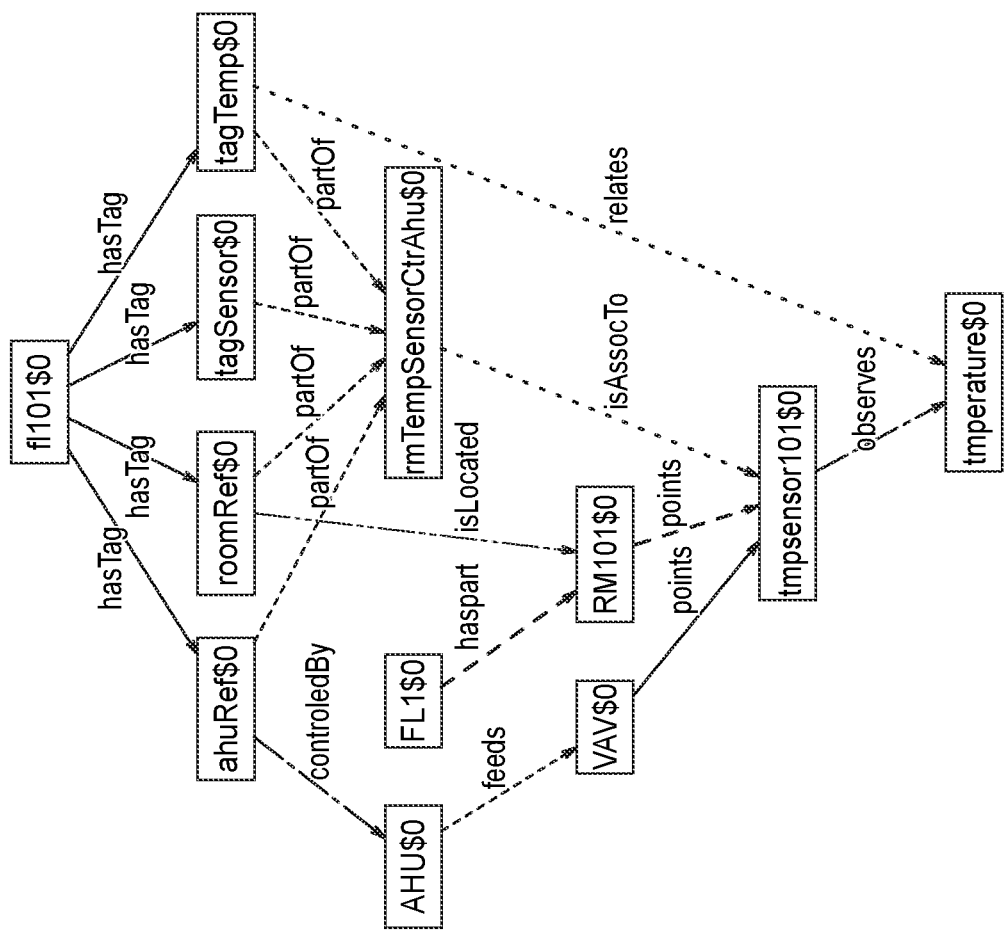
FIG. 10 shows an example of instance information (mapping information)

FIG. 10 shows the instance information (instance diagram) generated using an execution ("execute") function of an Alloy tool. The instance information is also called mapping information. Characters, such as "$0", are added to the instances for the sake of discrimination from classes.

The air conditioning system "AHU$0" feeds ("feeds") air to "VAV$0". "VAV$0" uses the temperature sensor "tmpsensor101$0" ("points").

The floor "FL$0" of the building includes a room "RM101$0". A temperature sensor is located in "RM101$0" ("points").

The contact point "fl101$0" has ("hasTag") four tags that are "autoRef$0", "roomRef$0", "tagSensor$0" and "tagTemp$0". The four tags each constitute a device model ("rmTempSensorCtrAhu$0") ("part of"). That is, each of the four tags is part of the device model ("rmTempSensorCtrAhu$0").

"tagTemp$0" tag indicates that the temperature sensor ("tmpsensor101$0") associated to ("isAssocTo") "rmTempSensorCtrAhu$0" observes ("observe") the temperature ("temperature$0"). The observation ("observe") is an example of the second relationship set for the temperature sensor with "temperature$0".

"roomRef$0" tag indicates that the temperature sensor is located ("isLocated") in the room ("RM101$0"). This location (isLocated) corresponds to an example of the second relationship set for the temperature sensor with "RM101$0".

"ahuRef$0" tag represents that the temperature sensor is controlled "controledBy" by "AHU$0". "controledBy" corresponds to an example of the second relationship set for the temperature sensor with "AHU$0".

"tagSensor$0" tag indicates that "fl101$0" is associated to ("isAssocTo") the temperature sensor ("tmpsensor101$0").

"feeds", "points" and the like in the diagram correspond to the first relationships defined in the original information model.

The instance information can be represented not only by the instance diagram of FIG. 10 but also by a table format. The instance information represented in the table format is called an instance table.

FIG. 11 shows an example of the instance table that includes the same content as FIG. 10. <SUBJECT, RELATIONSHIP, OBJECT>, or a set of the three, represents the relationship in one row. For each of the subject and the object, instance names and class names are described.

For example, it is shown that "fl101$0" is an instance of "ThePoint" class. It is shown that "fl101$0" has "hasTag" relationship with "ahuRef$0" that is an instance of "Tag" class.

As described above, the second relationship about the sensor can be consistently set for (added to) the information model (see the class diagram of FIG. 4), with the sensor (in detail, the contact point "Fl101" with the sensor) being assigned the tag information.

The instance information in FIG. 10 or 11 is a schema itself of a database that stores data detected by the sensor, and can easily identify the attribute information related to the sensor having detected the data, from the instance information. For example, the type of the sensor (e.g., a temperature sensor) and the room on the floor of the building provided with the sensor where data obtained can be identified. It is shown that the obtained data is used for air conditioning by "AHU", and the air-conditioned air is supplied by "VAV" as described above. It is also shown that the sensor described above detects the temperature of air supplied by "VA". Accordingly, information related to data (attribute information on the sensor) can be easily obtained, and stored as required items in the database.

The above description illustrates an example that can generate the instance information without infringing the restriction. If restriction infringement occurs, instance information on a case of the restriction infringement is generated. For example, when Alloy is used, restrictions that all the instances are required to satisfy are defined using "assert" statement. The Alloy tool has a function capable of searching whether there is a counterexample contradicting "assert" restriction or not. The mapper 12 checks presence or absence of a counterexample that does not satisfy the restriction indicated by the "assert" statement. If the counterexample is present, the mapper 12 generates the counterexample. If all the restriction are satisfied, no counterexample is generated. That is, instance information satisfying the restrictions is generated. Hereinafter, a specific example is described.

It is assumed that "ahuRef" among four pieces of tag information assigned to the contact point "FI101" in the example described above is not set. That is, it is assumed that the user defines, as tag information, only three pieces of tag information indicated in the following table, for the contact point "FI101".

TABLE 2

| Contact point name | Tag information |
|---|---|
| FI101 | [tagTemp, tagSensor, roomRef] |

FIG. 12 is an example of an "assert" definition corresponding to <restriction 4> described above. The restriction in FIG. 12 defines that every tag ("Tag") has ("hasTag") associated to the sensor contact point ("ThePoint"). That is, the restriction in FIG. 12 defines that every "Tag" belongs to any of contact points ("hasTag").

The example in FIG. 12 defines that every tag ("Tag") is associated to ("hasTag") the sensor contact point ("ThePoint"). If all the four pieces of tag information described above are set for the contact point "FI101", no counterexample contradicting the "assert" restriction in FIG. 12 is generated. However, if sensor information mapping is performed without setting tag information "ahuRef" for "FI101", a counterexample is generated that allows an "ahuRef" tag belonging to no contact point ("ThePoint") to be instantiated.

Figure 13:
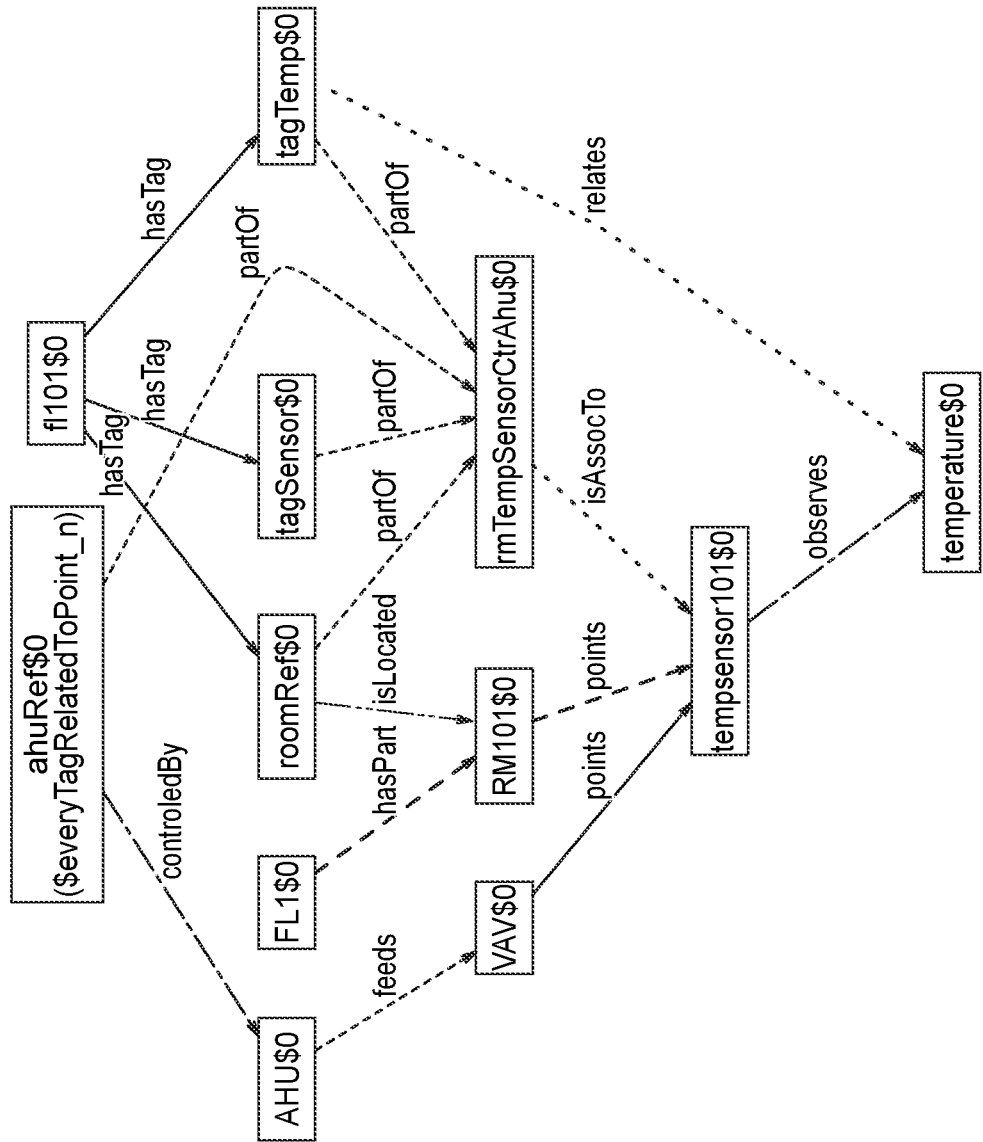
FIG. 13 shows an example of a counterexample.

FIG. 13 shows an example of a counterexample. "ahuRef$0" belongs to no sensor contact point. The fact that "ahuRef$0" tag belongs to no contact point infringes <restriction 4>. That is, <restriction 4> is not satisfied. Note that it is assumed that "tagHmd" in FIG. 4 is set for another contact point, and there is no lack of tagging.

FIG. 14 shows a counterexample in a table format. According to <restriction 4>, "ahuRef$0", which is an instance of the "Tag" class, is required to have a "hasTag" relationship with any instance of "ThePoint" class. However, the table of FIG. 14 includes "ahuRef$0" on the "OBJECT" column, but includes no row having "ThePoint" class on the "SUBJECT" column. Consequently, this counterexample does not satisfy <restriction 4>.

The restriction infringement detector 13 outputs, to the user, first information that notifies presence of restriction infringement based on instance information on the counterexample. The first information includes a counterexample, for example. Upon receipt of instruction data for correction from the user, the restriction infringement detector 13 corrects the tag definition information 23 or the information model 22, or adds or deletes the tag information to or from the contact point. The user can understand lack of setting of the tag information ("ahuRef") for the contact point through viewing the counterexample.

Figure 15:
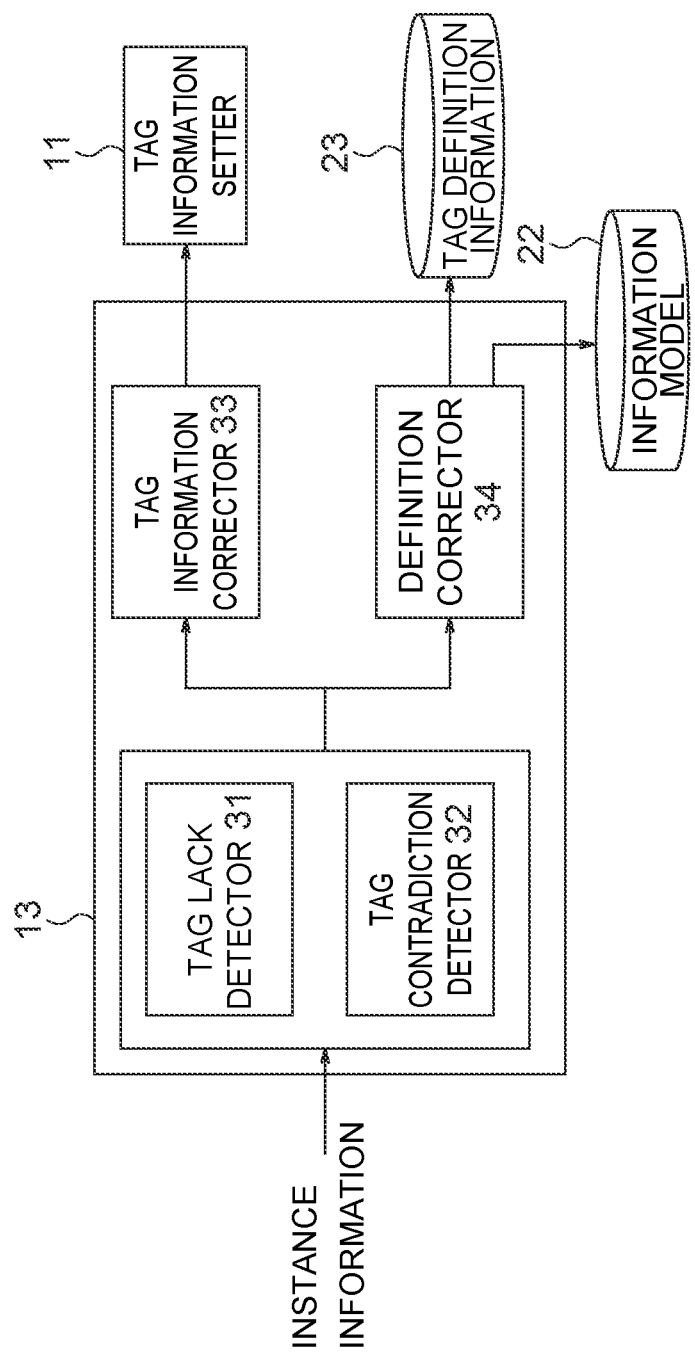
FIG. 15 is a block diagram of a restriction infringement detector.

FIG. 15 is a block diagram of the restriction infringement detector 13. The restriction infringement detector 13 includes a tag contradiction detector 32, a tag lack detector 31, a tag information corrector 33, and a definition corrector 34.

The tag lack detector 31 detects that tag information with lack of setting, or detects that setting of tag information is lacking, from the counterexample. According to the example of FIG. 13 or 14 described above, a counterexample indicating that "ahuRef" tag belonging to no contact point ("ThePoint") can be instantiated is generated. The tag lack detector 31 detects that setting of the tag ("ahuRef") for the contact point is lacking, from the counterexample. The tag information corrector 33 outputs the detected tag information to the user, thus prompting the user for correction.

For example, with reference to the table FIG. 14, the instance of "ThePoint" class is only "fl101$0". Consequently, it can be estimated that setting of "ahuRef" tag for the contact point "fl101" is lacking. FIG. 16 shows information about a lacking "ahuRef" tag in a single row. Consequently, to satisfy <restriction 4>, addition of an instance about the "ahuRef" tag based on the information shown in FIG. 16 is sufficient. The tag information corrector 33 may output the information in FIG. 16 to the user. The user views the information in FIG. 16, and can determine additional setting of the "ahuRef" tag for the contact point "fl101".

Detection of lack of tag information setting means a state of lack of the restriction, in the restriction satisfaction problem, that is, an "under constraint" state. In this case, the restriction of the information model 22 is satisfied, but an undesired instance configuration (coupling relationship between instances) is generated. Accordingly, the user may view the created instance information, identify the desired instance configuration and undesired instance configuration, and find lacking tag information on the basis of the difference between both.

The tag information corrector 33 receives an instruction of additional setting of tag information from the user, and requests the tag information setter 11 to additionally set the instructed tag information for the contact point. The tag information setter 11 adds, to the description of the definition of instance generation, the description of adding the requested tag information to the contact point. Subsequently, the mapper 12 performs instance generation again. Accordingly, correct instance information (mapping information) can be generated.

The tag contradiction detector 32 detects whether tag information contradicting the restriction about each of the information model and tag information is set for the contact point or not on the basis of the counterexample. If contradicting tag information is set, instance information satisfying the restriction cannot be set.

For example, it is assumed that tag information referring to a sensor (e.g., an infrared sensor) that is not defined in the information model is assigned to the contact point. In this case, there is no infrared sensor class is in the information model. Accordingly, no infrared sensor instance is generated, and no instance configuration indicating the relationship between the infrared sensor instance and the tag information instance is generated, either.

As described above, the tag contradiction detector 32 can detect, as trace information, information that no instance satisfying the restriction can be generated (no infrared class instance can be generated or the like in the example described above). By correcting the tag information, tag information without contradiction can be set. Tag information may be corrected by the tag information corrector 33 deleting the setting of the tag information on the contradicting tag from the contact point, on the basis of the trace information. The trace information may be presented to the user, the tag information to be deleted by the user may be determined, and the tag information corrector 33 may be instructed to delete the tag information.

Even if tag information is set for the contact point correctly (without contradiction or insufficiency), definition of the information model (configuration) or definition of the tag information itself sometimes has inadequacies. The definition of the information model can be corrected (including correction of the restriction), or the definition of the tag information can be corrected (for example, including correction of the restriction). The correction can solve insufficiency of the definition of the tag information, for example. The correction may be performed for the tag definition information 23 or the information model 22 by the definition corrector 34 on the basis of the instruction data from the user, for example.

For example, the user determines how to correct the information model or the tag definition information on the basis of the trace information or the like presented on the screen by the tag contradiction detector 32, and receives a correction instruction from the input interface. The definition corrector 34 corrects the information model 22 or the tag definition information 23 according to the correction instruction.

For example, when <restriction 4> is lacking, an unintentional instance is generated, thereby detecting lack of the restriction. Among generated instances, a desired instance and an undesired instance are determined, and the restriction is added on the basis of difference information on these instances, thereby allowing the tag definition information 23 to be corrected. If "ahuRef$0" is originally unnecessary, a correction of deleting "ahuRef$0" from the tag definition information 23 may be performed.

As described above, contradiction of tag information or lack of tag information is detected, and correct tag information is set for the contact point of the sensor, thereby allowing the relationship (second relationship) with the sensor to be added to the information model without contradicting the restriction. In the aforementioned example, the contact point of the sensor is described as the contact point. The method of this embodiment is also applicable similarly to a contact point for an actuator (VAV).

The determiner 14 identifies the relationship between the device (the temperature sensor in this example) related to the contact point and another element in the information model, on the basis of the mapping information (correctly generated instance information). For example, the second relationship set according to the tag information is identified. For another information model, the first relationship originally set for the temperature sensor may be identified. The determiner 14 determines attribute information on the device or attribute information on data obtained from the device is determined on the basis of the identified relationship.

In the example of the instance information in FIG. 10 or 11, a relationship ("isAssocTo") indicating that the device (target device) for which the contact point is set is the temperature sensor ("tmpsensor101$0") is identified as the second relationship set according to the tag information. A relationship where the temperature sensor is controlled by ("controledBy") "AHU$0", a relationship where the temperature sensor is located ("isLocated") in "RM101$0", and a relationship where the temperature sensor observes ("observes") the temperature ("temperature$0") are identified as the second relationships. Accordingly, for example, "tmpsensor101$0" that is the temperature sensor, "AHU$0" that is a controlled target ("controlled target"), "RM101$0" that is a location, and the temperature that is an observation target are determined as attribute information on the device.

A transformation rule generator 16 generates a transformation rule 24 that transforms data on the sensor corresponding to the contact point, on the basis of the determined attribute information described above, into a format in conformity with the data structure of the target system, that is, the format of the sensor database 25. That is, procedures of obtaining the data on the sensor, transforming the data, and storing the data are generated as the transformation rule. The procedures are called ETL procedures in the IoT field. The ETL procedures are procedures that include extracting ("Extract"), transforming ("Transform"), and loading ("Load"). For example, it is assumed that the items of the sensor database 25 include "DEVICE TYPE", "CONTROL TARGET", "LOCATION", "OBSERVATION TARGET" and "DEVICE OBSERVATION VALUE". In the example described above, the transformation rule 24 is generated that transforms inputs of data on the sensor (observation values) into "DEVICE TYPE, CONTROL TARGET, LOCATION, OBSERVATION TARGET and DEVICE OBSERVATION VALUE". For example, when the data on the sensor is "147", "147" is transformed into "'tmpsensor101$0', 'AHU$0', 'RM101$0', 'temperature$0' and '147'" according to the transformation rule 24. The transformation rule generator 16 stores the transformation rule 24 in a transformation rule storage 17 in association with identification information ("fl101" in this example) on the device corresponding to the contact point. Note that, instance names ("tmpsensor101$0", "AHU$0", "RM101$0" and "temperature$0") are herein stored. Alternatively, the instance names may be transformed into representations easily readable by users. For example, instead of "RM101$0", an actual room number may be used. Instead of "temperature$0", "temperature" may be used. Instead of "AHU$0", actual identification information (the name or the like) on AHU may be used. Instead of "tmpsensor101$0", actual identification information (the name or the like) on the temperature sensor may be used.

The receiver 19 receives data on the sensor transmitted from the sensor or the facility system 1. The identification information on the sensor (identification information on the contact point) is associated to the data on the sensor.

The process executor 18 reads the transformation rule from the transformation rule storage 17 that includes identification information on the contact point, and transforms the data on the sensor according to the read transformation rule. If the identification information on the sensor is "fl101" and the data on the sensor is "123", then "'tmpsensor101$0', 'AHU$0', 'RM101$0', 'temperature$0' and '123'" are output through execution of the transformation rule. The process executor 18 stores the output data in the sensor database 25.

FIG. 17 shows an example of the sensor database 25. In this example, a relational database is shown. Alternatively, another database, such as an XML database, may be adopted.

By referring to the sensor database 25, it can be identified which type of attribute information the data received from the sensor has, that is, the attribute information on the sensor can be easily identified. Through use of the database, the configuration of the target system 100 can be correctly understood and monitored, for example. It is shown which variable (first variable) of the control program the observation value (data) of the sensor is to be input into, and which actuator ("AHU$0" in this example) the variable (second variable) is to be calculated to control. The control program can be adjusted such that "147" is input into the first variable of the control program, the second variable for controlling "AHU$0" is calculated, and control information indicated by the second variable is transmitted to the facility system 1.

The mapping device 5 transmits instruction information for adjustment to the control system 2, and the control system 2 can input the data on the sensor received from the facility system 1 into the first variable according to the instruction information. The second variable can be calculated, and control information can be transmitted to the corresponding AHU ("AHU$0") of the facility system 1. Accordingly, the control system 2 can correctly control the facility system 1.

Note that in the example described above, the attribute information is set on the basis of all the pieces of tag information set for the contact points. Alternatively, the attribute information may be set on the basis of part of the set tag information.

Figure 18:
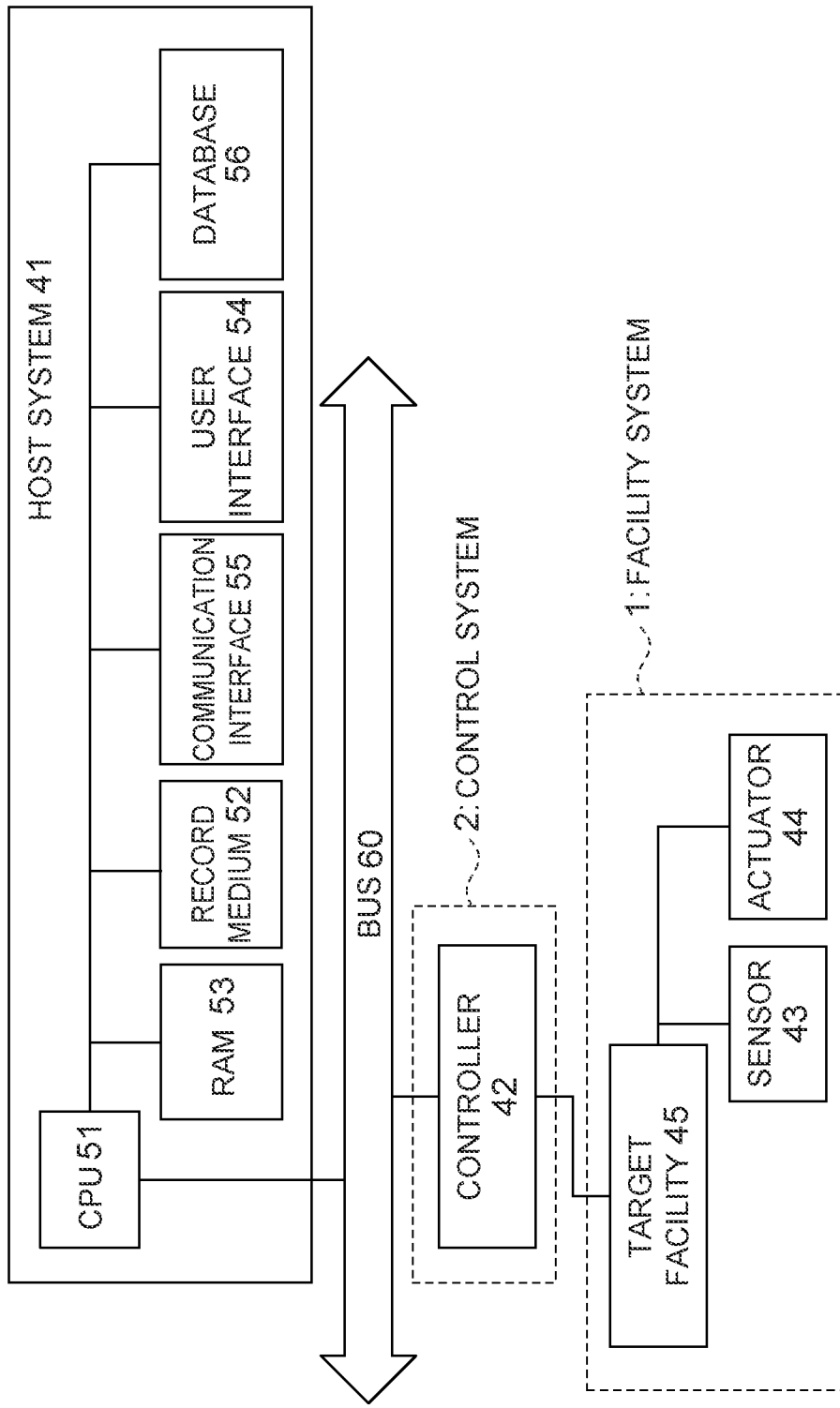
FIG. 18 is a hardware configuration diagram of an information processing system according to this embodiment.

FIG. 18 is a hardware configuration diagram of the information processing system according to this embodiment. The information processing system includes a host system 41, a controller 42, a sensor 43, an actuator 44, and a target facility (target device) 45.

The controller 42 is connected to the host system 41 via a bus 60. The controller 42 controls the target facility 45 in the facility system 1, via the actuator 44, on the basis of data detected by the sensor 43 of the facility system 1. The controller 42 stores the control program. A processor, such as a CPU, included in the controller 42 executes the control program, thereby achieving the function of the controller 42. The controller 42 communicates with the host system 41 via the bus 60.

The host system 41 includes a CPU 51, a record medium 52, a RAM 53, a user interface 54, a communication interface 55, and a database 56.

The record medium 52 includes an HDD or an SSD. The record medium 52 stores a computer program required to monitor and control the facility system.

The CPU 51 is connected to the controller 42 via the bus 60, controls the controller 42, and executes the computer program stored in the record medium 52.

The RAM 53 includes an SRAM, a DRAM or a flash memory. During execution of the CPU 51, the computer program and the like stored in the record medium 52 is deployed on the RAM 53, which temporarily stores the program.

The user interface 54 includes a display, a keyboard, and a mouse. The user interface 54 can accept an input from the user, and output information to the user.

The communication interface 55 communicates with the controller 42 via the bus 60.

The database 56 includes the sensor database 25 in the mapping device. The database 56 stores the sensor list 21, the tag definition information 23, the information model 22 and the like. Part of the data or information stored in the database 56 may be stored in the RAM 53.

Figure 19:
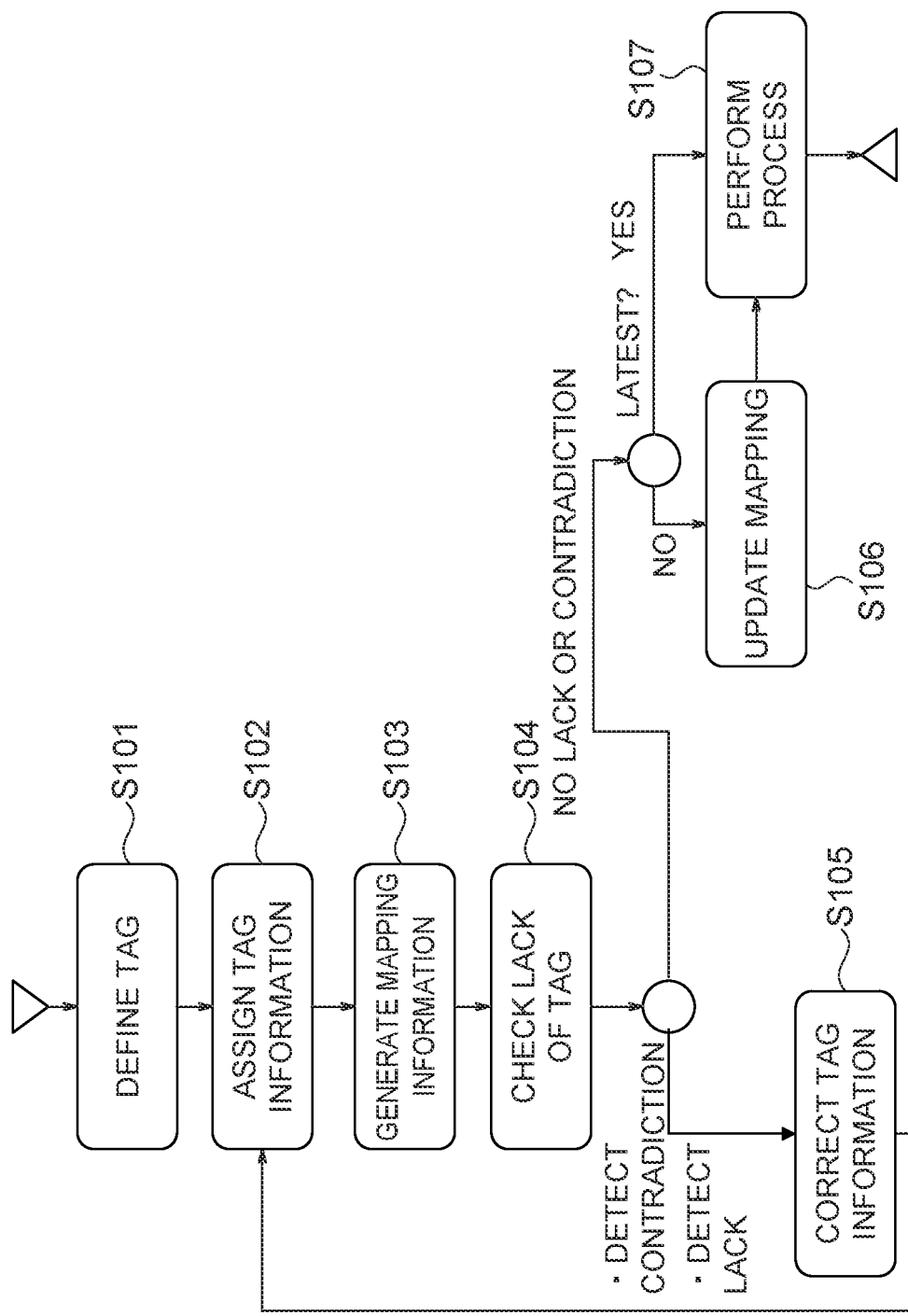
FIG. 19 is a flowchart of an example of an operation of a mapping device according to this embodiment.

FIG. 19 is a flowchart of an example of an operation of the mapping device 5 according to this embodiment. The mapping device 5 accepts inputs of the definition of the tag information and the restriction from the user, creates the tag definition information 23, and stores the tag definition information 23 in the information model management device 4 (S101).

The information model 22 is preliminarily stored in the information model management device 4. The tag information setter 11 selects one or more pieces of tag information among the pieces of tag information defined by the tag definition information 23, for each sensor in the sensor list 21, on the basis of the instruction data by the user, and sets the selected pieces of tag information for the sensor (S102). Specifically, for each contact point with the sensor, the selected pieces of tag information are set. The tag information setter 11 generates description of the definition of generating multiple instances including the contact point instance, on the basis of the instruction data by the user. The description of the definition is made on each contact point.

The mapper 12 generates instance information (e.g., an instance diagram or an instance table), as mapping information, on the basis of the generated description of the definition of instance generation, the information model 22, and the tag definition information 23 (S103). The mapping information corresponds to information that sets, in the information model including the first relationship between the elements, the second relationship for the element (first element) corresponding to the contact point instance with another element (second element), according to whether the condition designated by the tag definition information is satisfied or not. The mapper 12 corresponds to a setter that sets the second relationship as described above.

The restriction infringement detector 13 determines whether the tag information set for the contact point is lacking or the tag information set for the contact point is contradictory, on the basis of the instance information (mapping information) (S104). If the restriction infringement detector 13 detects lack or contradiction, this detector outputs information indicating the lack or contradiction, and information on which the lack or contradiction based, to the user (the same S105). When instruction data for correction is received from the user, correction, deletion or addition of the tag information set for the contact point, correction of the tag definition information, or correction of the information model is performed according to the instruction data (S105). The correction, deletion or addition of the tag information may be requested from the tag information setter 11, and the tag information setter 11 may correct, delete or add the tag information (S102).

If there is no lack or contradiction of the tag information, the determiner 14 determines whether the mapping information generated this time is the same as the mapping information generated last time for the same contact point. It is assumed that the determiner 14 stores the mapping information generated so far, in a storage, not shown, or the information model management device 4. If the mapping information is the same as the mapping information generated last time, the process of the transformation rule generator 16 is omitted and the processing proceeds to a process by the process executor 18 (S107). If the mapping information is different from the mapping information generated last time, or the mapping information is generated for the sensor for the first time, the determiner 14 determines attribute information on the device corresponding to the contact point on the basis of the mapping information (S106). The transformation rule generator 16 generates the transformation rule 24 on the basis of the determined attribute information (the same S106). The transformation rule 24 transforms the data on the sensor corresponding to the contact point into a format in conformity with the data structure about the target system 100. The transformation rule generator 16 stores the generated transformation rule 24 in the transformation rule storage 17. Subsequently, the processing proceeds to step S107.

In step S107, the process executor 18 identifies the identification information on the sensor on the basis of sensor data 26 received by the receiver 19, and reads the transformation rule having the identified identification information from the transformation rule storage 17. According to the read transformation rule, the sensor data 26 (e.g., an observation value) is transformed, and the transformed data is stored in the sensor database 25.

As described above, according to this embodiment, the sensor or the actuator is assigned a label called tag information, and the relationship between the tag information and the information model is defined, thereby allowing automatic mapping onto the information model. If there is lack or contradiction in the tag information to be set for the sensor or the actuator, the lack or contradiction can be detected. Accordingly, correct tag information can be redefined, and the tag information is corrected, thereby facilitating reduction in effort of mapping.

Second Embodiment

In the first embodiment, the case where the target system 100 is the building air conditioning system has been described. In a second embodiment, a case where the target system 100 is a boiler control system is described. The basic configuration and operation are the same, except in that the target system 100 is different. Accordingly, the detail description is appropriately omitted.

Figure 20:
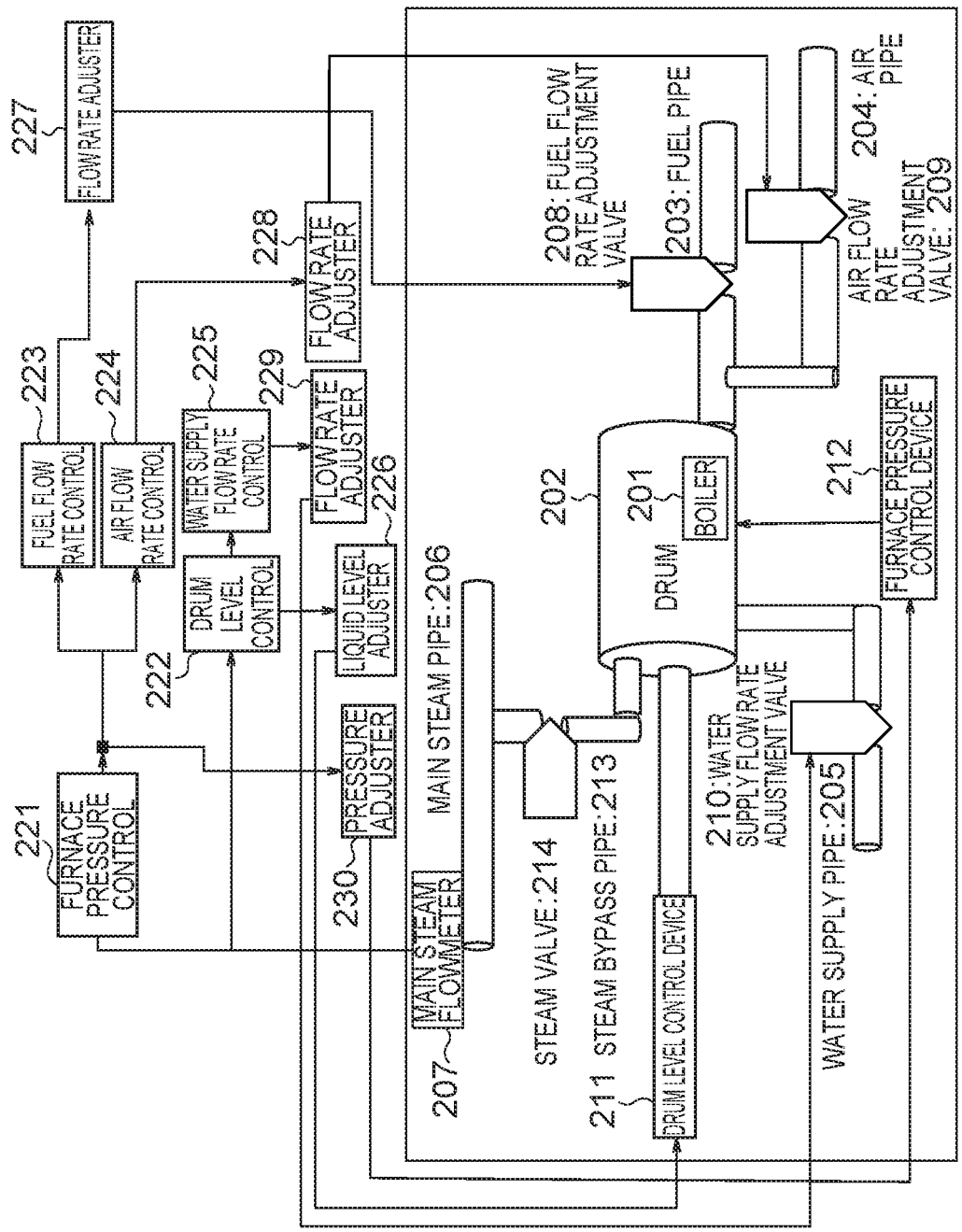
FIG. 20 schematically shows a specific example of a boiler control system as a target system according to this embodiment.

FIG. 20 schematically shows a specific example of a boiler control system (a facility system 1 and a control system 2) as a target system 100 according to this embodiment. In the facility system 1, fuel is burnt with air by a boiler 201 to generate heat, and a drum 202 turns water into steam by heat. A fuel pipe 203 that supplies fuel to the drum 202, an air pipe 204 that supplies air to the drum 202, a water supply pipe 205 that supplies water to the drum 202, and a main steam pipe 206 that outputs steam are connected. The main steam pipe 206 is provided with a main steam flowmeter 207. The main steam pipe 206 and the drum 202 communicate with each other through a steam bypass pipe 213. A steam valve 214 is provided at the middle of the steam bypass pipe 213. The control system includes, as subsystems: a furnace pressure control system 221 that controls the furnace pressure on the basis of the main steam flow rate; a drum level control system 222 that adjusts the water level in the drum; a fuel flow rate control system 223; an air flow rate control system 224; and a water supply flow rate control system 225. Flow rate adjusters 227, 228 and 229 that adjust the respective output flow rates of the fuel flow rate control system 223, the air flow rate control system 224, and the water supply flow rate control system 225 are provided. The pressure adjuster 230 that adjusts the furnace pressure is provided on the output side of the furnace pressure control system 221. The fuel pipe 203, the air pipe 204 and the water supply pipe 205 are provided respectively with flow rate adjustment valves (a fuel flow rate adjustment valve 208, an air flow rate adjustment valve 209, and a water supply flow rate adjustment valve 210), as control actuators. A drum level adjustment device 211 (drum level control device), and a furnace pressure adjustment device 212 (furnace pressure control device) are provided as control actuators.

Each control system is basically based on PID (Proportional-Integral-Differential Controller). The PID output of the furnace pressure control system 221 is cascaded to the air flow rate control system 224 and the fuel flow rate control system 223. The PID output of the drum level control system 222 is cascaded to the water supply flow rate control system 225 and the liquid level adjuster 226.

Figure 21:
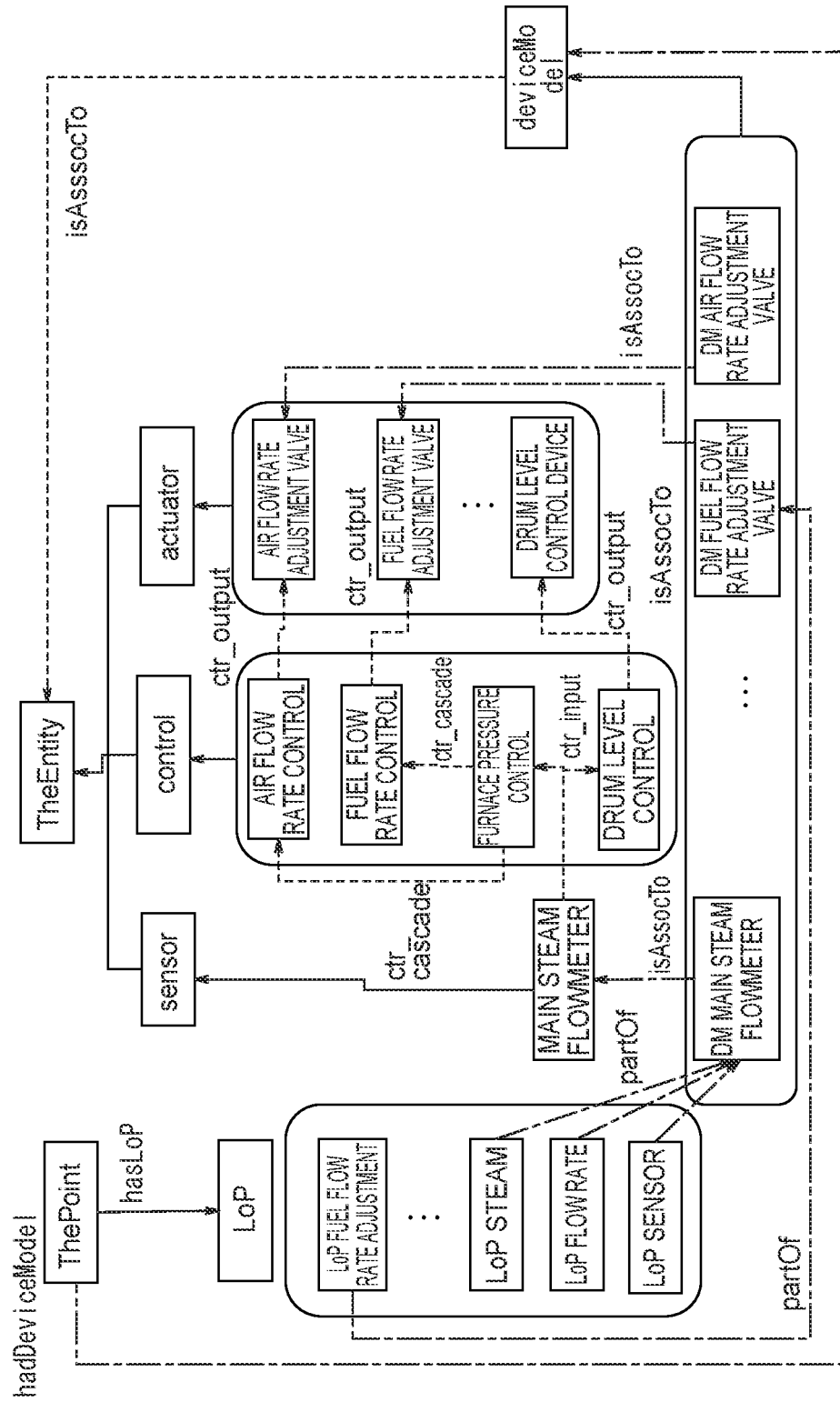
FIG. 21 shows a model of the boiler control system according to this embodiment.

FIG. 21 shows a model of a boiler control system as the information model 22 in this embodiment. The information model is shown according to a class diagram of the software engineering. Relationships that hold between elements included in the boiler control system are defined. For example, "MAIN STEAM FLOWMETER" and "FUR- NACE PRESSURE CONTROL" are connected by a relationship "ctr_input" that inputs a control signal. Note that in FIG. 21, some of the elements in FIG. 20, for example, the water supply flow rate adjustment valve, the furnace pressure control device and the like are omitted. "LoP" is an abbreviation of List of Property, and is a term corresponding to "Tag" (tag) described above. "LoP" can be replaced with "Tag".

A contact point ("ThePoint") for the device such as the sensor or actuator is associated to ("hasDeviceModel") the device model ("deviceModel"). The contact point ("ThePoint") can have ("hasLoP" or "hasTag") a plurality of "LoP" ("Tag").

"DeviceModel" is a class of a model of a specific device. The class of the model of the specific device is inherited, and a model of the main steam flowmeter, a model of the fuel flow rate adjustment valve, and a model of the air flow rate adjustment valve are defined as a DM main steam flowmeter, a DM fuel flow rate adjustment valve, and a DM air rate adjustment valve, respectively.

Tag information, such as on an LoP sensor, an LoP flow rate and an LoP steam, is defined as tag information for the main steam flowmeter. More specifically, the LoP sensor, the LoP flow rate tag and the LoP steam are defined as classes inheriting the Tag class (LoP class). LoP fuel flow rate adjustment, LoP air flow rate adjustment (not shown), LoP furnace pressure control (not shown) and the like are defined as other tag information.

Restrictions similar to those in the first embodiment can be defined as tag information definitions. For example, similar to the case of the example of the air conditioning system described above, the following restrictions are defined.

<Restriction 3> Every "Tag" should be "part of" any device model.

<Restriction 4> Every "Tag" belongs to any contact point ("hasLop" or "hasTag").

FIG. 22 shows an example of describing the information model in FIG. 21 in the Alloy form. Note that the definitions and the like of the classes of the DM main steam flowmeter, the DM fuel flow rate adjustment valve and the DM air flow rate adjustment valve in FIG. 21 (definitions of classes inheriting "deviceModel") are omitted.

FIG. 23A shows a description of the definition of tag information in the Alloy form. "LoP" is defined as an abstract class of the tag. "LoP" is part of ("partOf") "deviceModel". "LoP" is inherited, and three tags ("LoP STEAM", "LoP FLOW RATE", and "LoP SENSOR") are defined (individual definitions of LoP). Each tag is part of ("partOf") the DM main steam flowmeter. FIG. 23B shows a restriction that every device model ("deviceModel") is associated to ("isAssocTo") any "TheEntity".

FIG. 24 shows an example of defining a restriction of tag information about the information model in the Alloy form. "fact" means a restriction.

The first restriction is a restriction that the DM main steam flowmeter as a device model has three pieces of tag information as components.

The second restriction is a restriction that every piece of tag information is part of the device model.

The third restriction is a restriction that every piece of tag information belongs to ("hasLoP") the contact point ("ThePoint"). Hereinafter, description is continued using a specific example.

It is assumed that in the tag information setter 11, six pieces of tag information that are LoP steam, LoP flow rate, LoP sensor, LoP fuel flow rate adjustment valve, Lop air flow rate adjustment valve, and LoP furnace pressure control are set for the contact point ("FI101").

TABLE 3

| Contact point name | Tag information |
|---|---|
| FI101 | [LoP steam, LoP flow rate, LoP sensor, LoP fuel flow rate adjustment valve, LoP air flow rate adjustment valve, and LoP furnace pressure control] |

Also in this example, likewise with the case of the example of the air conditioning system, the mapper 12 generates (instance generation) mapping information using software called Alloy.

FIG. 25 shows a situation (user input situation) of setting three pieces of tag information that are "LoP STEAM", "LoP FLOW RATE", and "LoP SENSOR" for the contact point "FI101". Tag information on "LoP FURNACE PRESSURE CONTROL" is set for a contact point "pic102", as another example. For a contact point "fic101s", tag information on "LoP FUEL FLOW RATE ADJUSTMENT VALVE" is defined. Furthermore, for a contact point "fic103", tag information on "LoP AIR FLOW RATE ADJUSTMENT VALVE" is defined. As described above, based on instruction data by the user, the tag information setter defines an instance of the contact point shown in FIG. 25, and also defines another instance (not shown).

Figure 26:
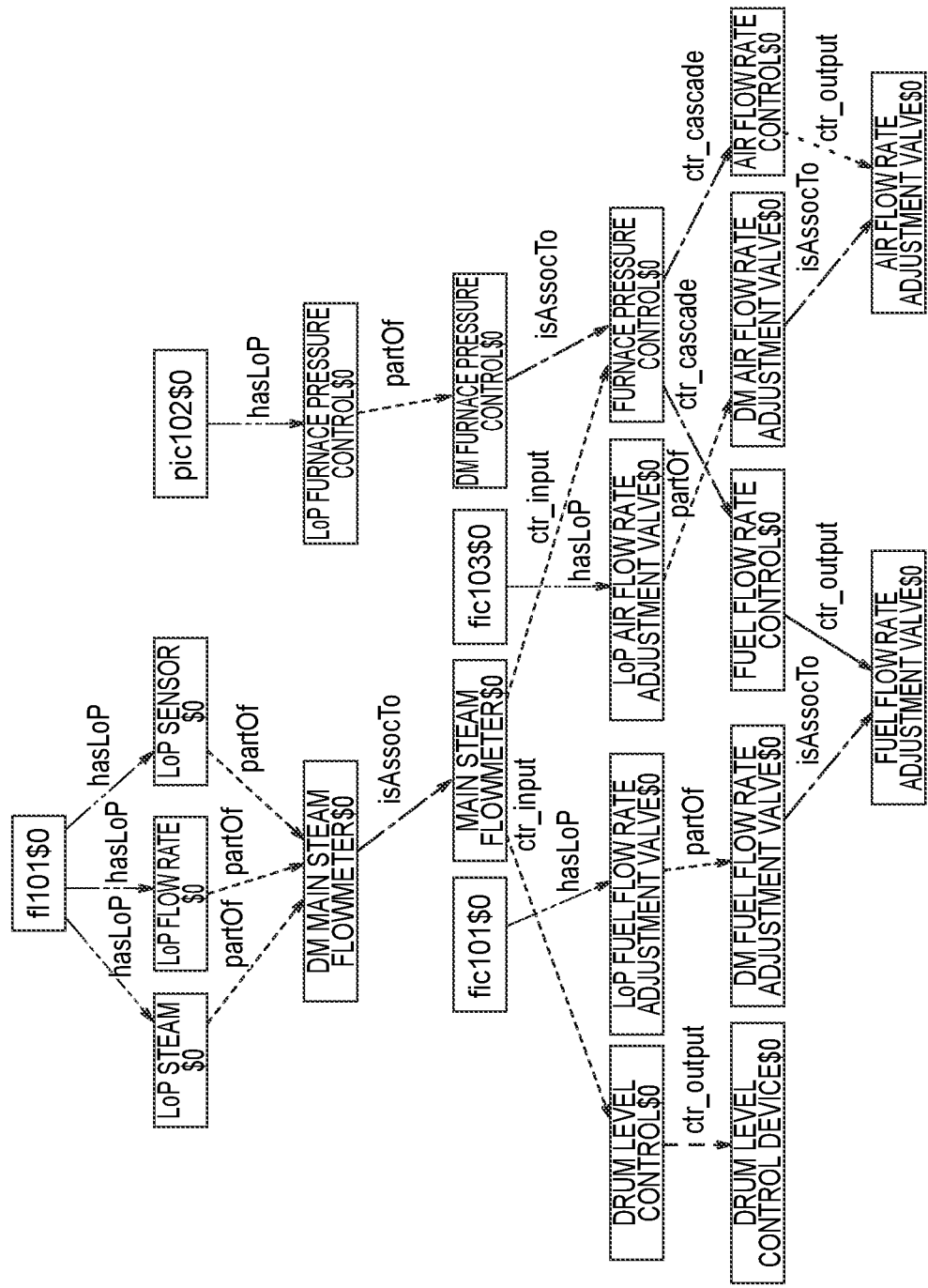
FIG. 26 shows an example of instance information (mapping information)

FIG. 26 shows the instance information (mapping information) generated by executing instance generation using an execution ("execute") function of the Alloy tool. The instance generation is executed on the basis of instance generation code in FIG. 25, the information model in FIG. 22, and the tag definition information in FIGS. 23A, 23B and 24. FIG. 26 shows the instance information in an instance diagram. Characters, such as "$0", are added to the instances for the sake of discrimination from classes.

In FIG. 26, "DM MAIN STEAM FLOWMETER $0" is associated to ("isAssocTo") the "MAIN STEAM FLOWMETER $0". "MAIN STEAM FLOWMETER $0" is connected to "DRUM LEVEL CONTROL $0" and "FURNACE PRESSURE CONTROL $0" by "ctr_input" relationship (relationship designating control). "FURNACE PRESSURE CONTROL $0" is, in turn, connected to "FUEL FLOWMETER $0" and "AIR FLOWMETER $0" by "ctr_cascade" relationship (parallel relationship). "DRUM LEVEL CONTROL $0" is connected to "DRUM LEVEL CONTROL DEVICE $0" by "ctr_output" relationship (relationship designating control output). "FUEL FLOW RATE CONTROL $0" is connected to "FUEL FLOW RATE ADJUSTMENT VALVE $0" by "ctr_output" relationship. "AIR FLOW CONTROL $0" is connected to "AIR FLOW RATE ADJUSTMENT VALVE $0" by "ctr_output" relationship.

The sensor contact point "fl101$0" has ("hasLoP") three pieces of tag information that are "LoP STEAM $0", "LoP FLOW RATE $0" and "LoP SENSOR $0". Each piece of tag information is part of ("part of") "DM MAIN STEAM FLOWMETER $0", which is the sensor. The sensor contact point "FI101$0" is associated to ("isAssocTo") "MAIN STEAM FLOWMETER $0" via "DM MAIN STEAM FLOWMETER $0". That is, the tag information indicates that "MAIN STEAM FLOWMETER $0" is a contact point target (observation target) by the relationship (second relationship) that is "isAssocTo".

"fic101s$0" has "LoP FUEL FLOW RATE ADJUSTMENT VALVE $0" as tag information. The tag information is part of ("part of") the device model ("DM FUEL FLOW RATE ADJUSTMENT VALVE $0"). "fic101s$0" is associated to ("isAssocTo") "FUEL FLOW RATE ADJUSTMENT VALVE $0" via "DM FUEL FLOW RATE ADJUSTMENT VALVE $0". That is, the tag information indicates that "FUEL FLOW RATE ADJUSTMENT VALVE $0" is a contact point target (operation target) by the relationship (second relationship) that is "isAssocTo".

"fic103$0" has "LoP AIR FLOW RATE ADJUSTMENT VALVE $0" as tag information. The tag information is part of ("part of") the device model ("DM AIR FLOW RATE ADJUSTMENT VALVE $0"). "fic103$0" is associated to ("isAssocTo") "AIR FLOW RATE ADJUSTMENT VALVE $0" via "DM AIR FLOW RATE ADJUSTMENT VALVE $0". That is, the tag information indicates that "AIR FLOW RATE ADJUSTMENT VALVE $0" is a contact point target (operation target) by the relationship (second relationship) that is "isAssocTo".

"pic102$0" has "LoP FURNACE PRESSURE CONTROL $0" as tag information. The tag information is part of ("part of") the device model ("DM FURNACE PRESSURE CONTROL $0"). "pic102$0" is associated to ("isAssocTo") "FURNACE PRESSURE CONTROL $0" via "DM FURNACE PRESSURE CONTROL $0". That is, the tag information indicates that "FURNACE PRESSURE CONTROL $0" is a contact point target (operation target) by the relationship (second relationship) that is "isAssocTo".

As described above, the relationship indicated by the tag information can be set for the instance of the specific device, such as a sensor or an actuator, without contradicting the restriction of the information model and the restriction of the tag information. The instance diagram of FIG. 26 can be regarded as the schema itself of the database that stores detection data by the sensor and operation data (control information) on the actuator.

Next, a case of tag information lack detection by the restriction infringement detector 13 is described. It is assumed that in the case described above, among the six pieces of tag information set for the contact point "FI101", the LoP flow rate is not set. That is, it is assumed that as described below, five pieces of tag information (LoP steam, LoP sensor, LoP fuel flow rate adjustment valve, LoP air flow rate adjustment valve, and LoP furnace pressure control) are set for the contact point "FI101".

TABLE 4

| Contact point name | Tag information |
|---|---|
| FI101 | [LoP steam, LoP sensor, LoP fuel flow rate adjustment valve, LoP air flow rate adjustment valve, and LoP furnace pressure control] |

It is assumed that there is a restriction in FIG. 27 as the restriction of the tag information. FIG. 27 is an example of an "assert" definition corresponding to <restriction 4> described above. The restriction in FIG. 27 defines that every tag information ("Tag") is associated to ("hasLoP") the sensor contact point ("ThePoint"). That is, the restriction in FIG. 27 defines that every tag information "Tag" belongs to any of contact points ("hasLoP").

The restriction infringement detector 13 has, as a function of the Alloy tool, a function capable of searching whether there is a counterexample contradicting an "assert" restriction or not. If all the six pieces of tag information described above are set, no counterexample contradicting the "assert" restriction is generated. However, if no LoP flow rate is set, as tag information, for the contact point "FI101", a counterexample indicating that the LoP flow rate belonging to no contact point ("ThePoint") can be instantiated is generated.

Figure 28:
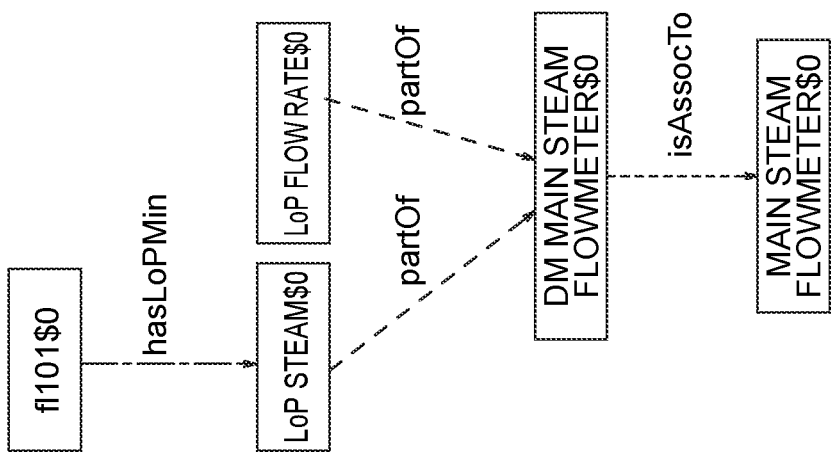
FIG. 28 shows an example of a counterexample.

FIG. 28 shows an example of a generated counterexample. "LoP FLOW RATE $0" becomes tag information belonging to no contact point, and does not satisfy <restriction 4>. The counterexample shows that tagging of LoP flow rate is lacking.

The operation of the restriction infringement detector 13 is similar to that in the first embodiment. Accordingly, the description is omitted.

The determiner 14 identifies the relationship between the device (the temperature sensor in this example) related to the contact point and another element in the information model, on the basis of the mapping information (correctly generated instance information). In the example in FIG. 26, for example, it is identified, by "isAssocTo", that the contact point regards the main steam flowmeter as the observation target. Based on the identified relationship, the attribute information on the device is determined. For example, the determiner 14 determines that the observation target is the main steam flowmeter, as attribute information.

The transformation rule generator 16 generates the transformation rule 24 on the basis of the attribute information determined by the determiner 14, the specific data structure of the information model of the target system 100, the instance information, and the data structure of data received by the receiver 19.

Figure 29:
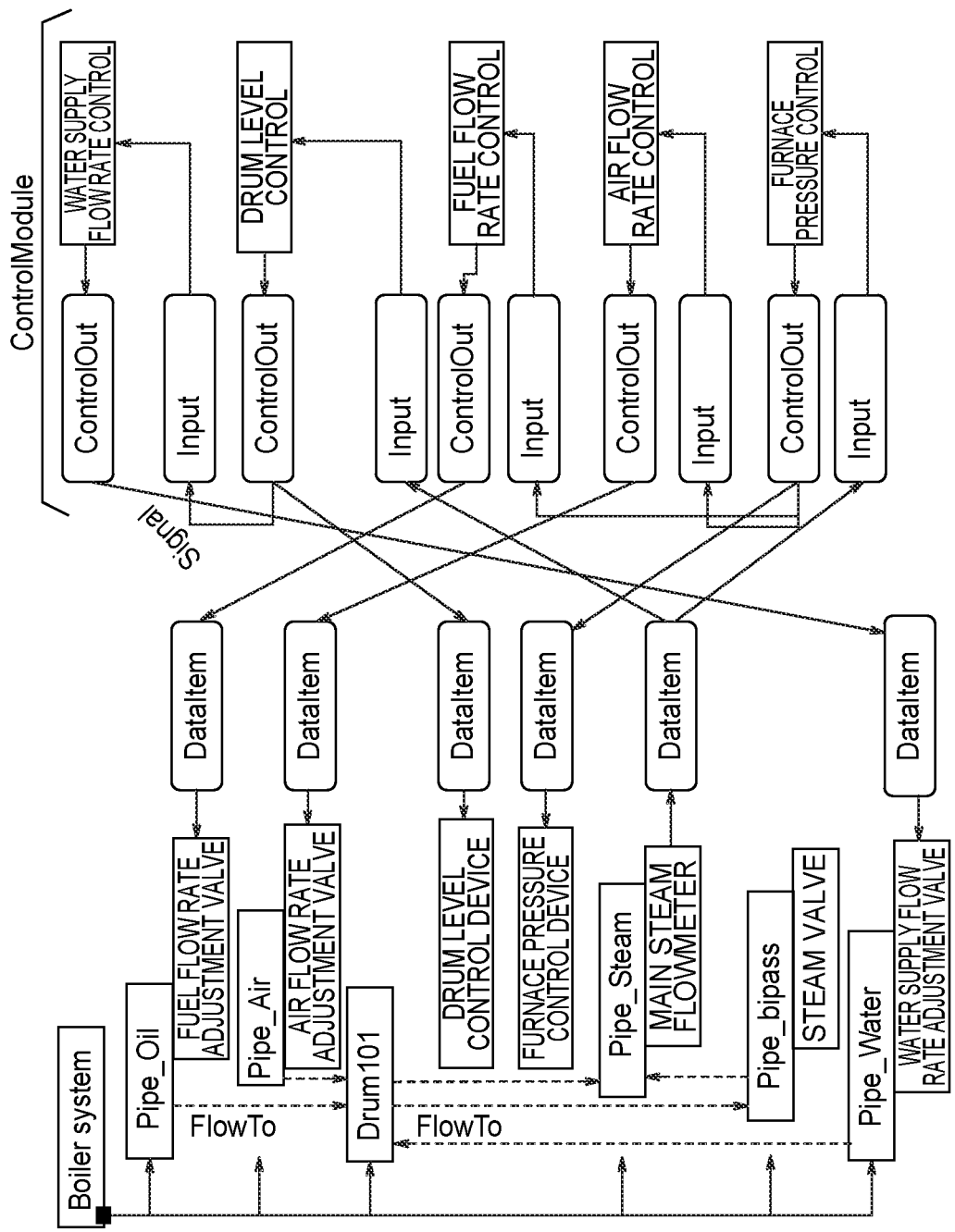
FIG. 29 shows an example of a specific data structure about a target system.

FIG. 29 shows an example of a specific data structure about the target system 100 (boiler control system). The sensor database 25 stores data according to the data structure. The data structure is achieved by XML or a relational database. In FIG. 29, "Data item" corresponds to a data item (field) that stores data on the sensor or data on the actuator. "Input" corresponds to a data item (field) that stores data to be input into the control system. "ControlOut" corresponds to a data item (field) that stores data to be output from the control system. The sensor database 25 may have a folder layered structure. In this case, the data may be stored in a corresponding folder (data item).

The sensor data 26 obtained from the sensor is received by the receiver 19.

FIG. 30 shows an example of the data structure (source data structure) of the sensor data 26. Besides the detection value (observation value) of the sensor and the sensor name (sensor identification information), tag information is set for the sensor data 26 on the transmission side. In the example in the diagram, the name of the sensor contact point is "fI101", the tag information set for the contact point is "LoP STEAM", "LoP FLOW RATE" and the like, and the observation value of the sensor is "133". In the source data structure in FIG. 30, the source data structure for one sensor is shown. Likewise, a source data structure may be defined for a contact point corresponding to another sensor or actuator.

The case is assumed where the data on the sensor has the source data structure as described above, and an example of generating the transformation rule is described.

Figure 31:
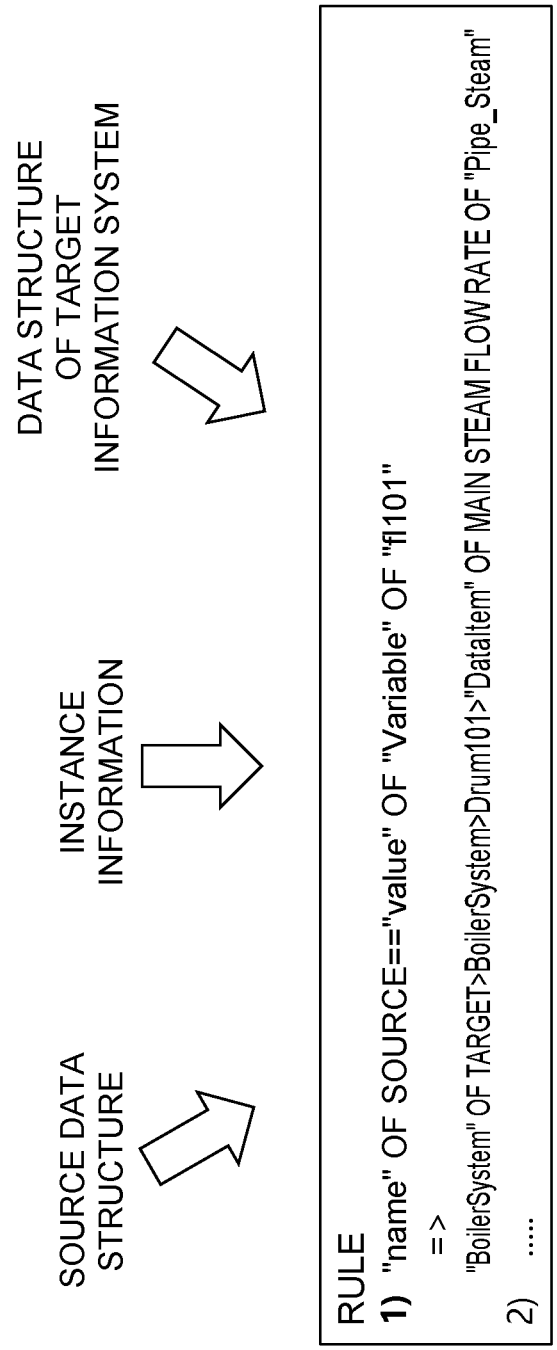
FIG. 31 illustrates a case where a transformation rule generator generates a transformation rule.

FIG. 31 shows a case where the transformation rule generator 16 generates the transformation rule. In this example, the transformation rule that transforms the data on the sensor in conformity with the data structure about the target system 100, on the basis of the instance information, the source data structure, and the data structure.

Transformation Rule
(1) "name" of source="value" of "Variable" of "fI101"=>"BoilerSystem" of target>"Drum101">"DataItem" of main steam flow rate of "Pipe_Steam"
(2) . . .

That is, the transformation rule (1) transforms the value of the sensor variable ("Variable") with the contact point value having "fI101", into "BoilerSystem">"Drum101">the data item value (e.g., the main steam flow rate value) of main steam flowmeter of "Pipe_Steam", in the source data structure. The main steam flowmeter to be referred to by the tag information is specifically identified as attribute information. The relationship (layered relationship) between the main steam flowmeter, and "BoilerSystem" and "Drum101" can be grasped, from the data structure (see FIG. 29) about the target system 100. In the second embodiment, the layered relationship between the main steam flowmeter and the other elements are identified using the data structure about the target system 100. However, "BoilerSystem" and "Drum101" may be grasped as the attribute information by defining "BoilerSystem", "Drum101" and the like according to the information model as with the first embodiment. The transformation rule is associated to the contact point value (sensor name) and the tag information, and is stored in the transformation rule storage 17.

When the process executor 18 receives the data on the sensor (source data structure) from the receiver 19, this executor selects the transformation rule from the transformation rule storage 17 on the basis of the contact point value (name) included in the data and of the tag information, and reads the selected transformation rule. The process executor 18 generates data in a format in conformity with the data structure about the target system 100, from the value of the variable included in the data, according to the read transformation rule. The process executor 18 stores the generated data in the sensor database 25.

When the data on the sensor having the data structure shown in FIG. 30 described above is received, the generated data is, for example, "'BoilerSystem'>'Drum101'>main steam flow rate '133' of 'Pipe_Steam'". For example, the generated data may be represented in the XML format, and stored in the sensor database 25. Alternatively, in the case where the sensor database 25 is the relational database, "BoilerSystem", "Drum101", "Pipe_Steam", "MAIN STEAM FLOW RATE" and "133" may be stored in the respective items.

FIG. 32A shows an example where "BoilerSystem", "Drum101", "Pipe_Steam", "MAIN STEAM FLOW RATE" and "133" are stored in the respective items in the relational database. According to another method, all possible item names, such as "BoilerSystem", "Drum101", "Pipe_Steam" and "MAIN STEAM FLOW RATE", are prepared as field names. If the item corresponds, "T", the sensor value or the like is stored. "F" or "Null" is stored in each of non-corresponding items. FIG. 32B shows an example where "T" or the sensor value is stored in the items of "BoilerSystem", "Drum101", "Pipe_Steam" and "MAIN STEAM FLOW RATE", and "F" is stored in each of the other items.

Figure 33:
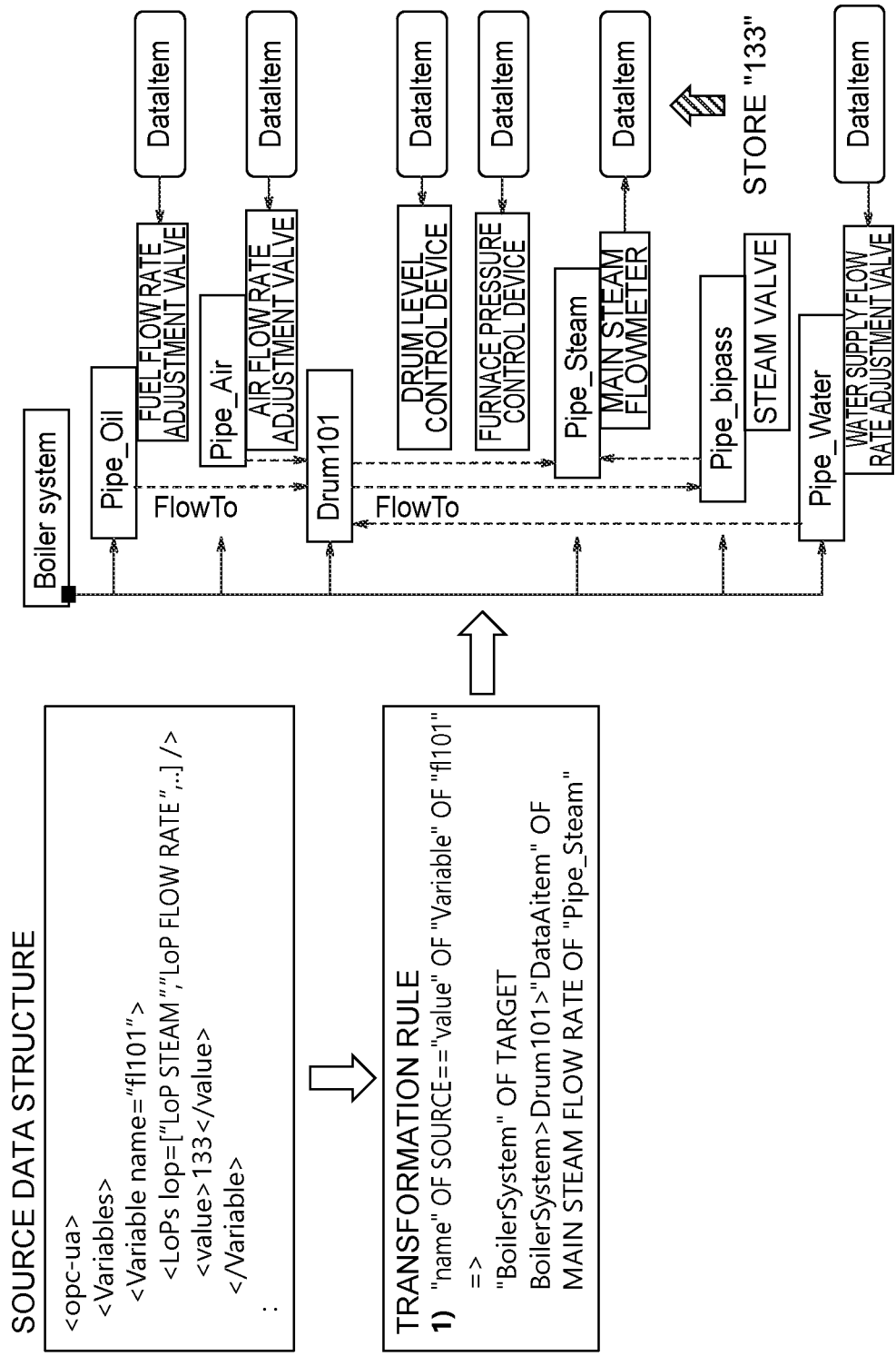
FIG. 33 shows a situation of generating data in a format complying with a data structure about the target system.

FIG. 33 shows a situation where data in a format in conformity with the data structure about the target system 100 is generated from the sensor variable value ("133") corresponding to the contact point ("f101") assigned the tag information (LoP information), using the generated transformation rule. The data item corresponding to the main steam flowmeter is identified. The data in the format according to which the sensor variable value is stored in the identified data item, is stored in the sensor database 25. The storing format may be the relational database as in FIGS. 32A and 32B, or an XML database. The database may have a folder layered structure. In this case, the data may be stored in a corresponding folder (data item).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
    processing circuitry configured to:
        select, from a plurality of relationship setting information, relationship setting information indicating that a second relationship is to be set with at least one second element for a first element based on first information including first relationships between a plurality of elements in a target system, wherein the relationship setting information includes a condition regarding a type of a first relationship of the first relationships required to be present between the first element and the at least one second element;
        determine whether the condition regarding the type of the first relationship is satisfied based on the first information; and
        set the second relationship between the first element and the at least one second element when the condition is satisfied, and control the target system based on the set second relationship.

2. The information processing apparatus according to claim 1,
    wherein the first element is a sensor for detecting a value or an actuator operating according to an operation amount indicated by a value.

3. The information processing apparatus according to claim 2, further comprising receiving circuitry configured to receive data including a value obtained for the first element and including identification information of the first element, and
    the processing circuitry determines attribute information of the value in the received data to be the second relationship set for the first element identified by the identification information in the received data, and associates the identification information with the value and the determined attribute information to generate associated data.

4. The information processing apparatus according to claim 3, wherein the processing circuitry is configured to generate a transformation rule for associating the attribute information with the identification data of the first element and the transformation rule in a database,
    wherein the processing circuitry identifies the identification information of the first element included in the received data, detects from the database a transformation rule including the identified identification information, associates the attribute information included in the transformation rule with the identification information of the first element and the value in the received data to generate the associated data.

5. The information processing apparatus according to claim 4, wherein the plurality of elements and the relationship setting information is classes, respectively, and the first relationships are set between the classes,
    the processing circuitry instantiates the plurality of elements and the relationship setting information based on predetermined constraints between the classes and the condition to generate instance information representing relationship between the instances, and if the condition is satisfied, the second relationship is set between the instanced first element and the instanced second element in the instance information.

6. The information processing apparatus according to claim 1, wherein the processing circuitry is configured to detect whether the first information in which the second relationship is set satisfies a restriction, and output information indicating that the restriction is not satisfied when the restriction is not satisfied.

7. The information processing apparatus according to claim 6, wherein the processing circuitry is configured to receive instruction data for correcting the relationship setting information, and correct the relationship setting information, based on the instruction data.

8. The information processing apparatus according to claim 6, wherein the processing circuitry is configured to receive instruction data for adding or deleting the relationship setting information, and add or delete the relationship setting information for the first element, based on the instruction data.

9. The information processing apparatus according to claim 6,
    wherein the processing circuitry detects that relationship setting information to be set for the first element is not yet set.

10. The information processing apparatus according to claim 6,
    wherein the processing circuitry detects that the second relationship for the first element contradicts the restriction.

11. The information processing apparatus according to claim 6,
    wherein the first information is an information model of the target system including a plurality of components,
    the restriction requires that
        the first relationship is set between the first element and a third element of the plurality of elements, and
        the first relationship defines that a component corresponding to the first element in the target system is located on a component corresponding to the third element of the plurality of elements.

12. The information processing apparatus according to claim 6,
    wherein the processing circuitry selects one or more pieces of the relationship setting information from among a plurality of pieces of the relationship setting information, for one or more of the first elements, and
    the restriction requires that every piece of the relationship setting information is selected to any of the one or more of the first elements.

13. The information processing apparatus according to claim 1,
    wherein the processing circuitry sets the second relationship to thereby map the first element to the at least one second element indicated by the relationship setting information.

14. The information processing apparatus according to claim 1,
wherein the first information is an information model of the target system.

15. The information processing apparatus according to claim 14,
wherein the information model is a modelized air conditioning system of a building, and
the plurality of elements include components constituting the building, at least one sensor located in the building, a physical quantity to be measured by the sensor, and at least one component constituting a control system controlling air conditioning of the building.

16. The information processing apparatus according to claim 14,
wherein the information model is a modelized boiler control system, and
the plurality of elements include components constituting the building, at least one sensor measuring a physical quantity in the boiler control system, an actuator to output depending an operation amount given to the actuator, and a control system controlling the actuator.

17. The information processing apparatus according to claim 1, further comprising:
an input circuit for a user to input an instruction, and
wherein the processing circuitry selects at least one relationship setting information from a plurality of relationship setting information based on the user's instruction and determine whether the condition in the selected relationship setting information is satisfied.

18. The information processing apparatus according to claim 1, wherein the plurality of elements and the relationship setting information is classes, respectively, and the first relationships are set between the classes,
the processing circuitry instantiates the plurality of elements and the relationship setting information based on predetermined constraints between the classes and the condition to generate instance information representing relationship between the instances, and if the condition is satisfied, the second relationship is set between the instanced first element and the instanced second element in the instance information.

19. An information processing method, comprising:
selecting, from a plurality of relationship setting information, relationship setting information indicating that a second relationship is to be set with at least one second element for a first element based on first information including first relationships between a plurality of elements in a target system, wherein the relationship setting information includes a condition regarding a type of a first relationship of the first relationships required to be present between the first element and the at least one second element;
determining that the condition regarding the type of the first relationship is satisfied based on the first information; and
setting the second relationship between the first element and the at least one second element upon the determination, and controlling the target system based on the set second relationship.

20. A non-transitory computer readable medium having a computer program stored therein which when executed by a computer, causes the computer to perform processes, comprising:
selecting, from a plurality of relationship setting information, relationship setting information indicating that a second relationship is to be set with at least one second element for a first element based on first information including first relationships between a plurality of elements in a target system, wherein the relationship setting information includes a condition regarding a type of a first relationship of the first relationships required to be present between the first element and the at least one second element; and
determining whether the condition regarding the type of the first relationship is satisfied based on the first information; and
setting the second relationship between the first element and the at least one second element when the condition is satisfied, and controlling the target system based on the set second relationship.

21. An information processing system, comprising:
a target system including a plurality of elements;
processing circuitry configured to:
select, from a plurality of relationship setting information, relationship setting information indicating that a second relationship is to be set with at least one second element for a first element based on first information including first relationships between a plurality of elements in a target system, wherein the relationship setting information includes a condition regarding a type of a first relationship of the first relationships required to be present between the first element and the at least one second element; and
determine whether the condition regarding the type of the first relationship is satisfied based on the first information; and
set the second relationship between the first element and the at least one second element when the condition is satisfied, and control the target system based on the set second relationship.

* * * * *